United States Patent [19]

Lamiaux

[11] 4,128,873

[45] Dec. 5, 1978

[54] STRUCTURE FOR AN EASILY TESTABLE SINGLE CHIP CALCULATOR/CONTROLLER

[75] Inventor: Sylves L. Lamiaux, Ancretieville St-Victor, France

[73] Assignee: Burroughs Corporation, Detroit, Mich.

[21] Appl. No.: 834,929

[22] Filed: Sep. 20, 1977

[51] Int. Cl.² ............... G06F 11/00; G06F 7/00
[52] U.S. Cl. ................... 364/200; 235/304; 235/303.42
[58] Field of Search ... 364/200 MS File, 900 MS File; 235/304, 303.42, 303.4, 302

[56] References Cited

U.S. PATENT DOCUMENTS

| 3,386,082 | 5/1968 | Stafford et al. | 364/200 |
|---|---|---|---|
| 3,517,171 | 6/1970 | Avizienis | 364/200 |
| 3,544,973 | 12/1970 | Borck et al. | 364/200 |
| 3,768,074 | 10/1973 | Sharp et al. | 364/200 |
| 3,771,131 | 11/1973 | Ling | 364/200 |
| 3,921,142 | 11/1975 | Bryant et al. | 364/900 |
| 3,997,895 | 12/1976 | Cassonnet et al. | 364/200 |
| 4,003,033 | 1/1977 | O'Keefe et al. | 364/200 |
| 4,014,005 | 3/1977 | Fox et al. | 364/200 |
| 4,023,142 | 5/1977 | Woessner | 364/200 |
| 4,050,058 | 9/1977 | Garlic | 364/200 |

*Primary Examiner*—Mark E. Nusbaum

*Attorney, Agent, or Firm*—Dale V. Gaudier; Edward J. Feeney, Jr.; Kevin R. Peterson

[57] ABSTRACT

A structure for an easily testable single chip calculator/controller comprising an arithmetic logic unit (ALU) and a plurality of active storage elements all interconnected in parallel via an input bus and an output bus. Instructions contained in a read only memory (ROM) are read out into an instruction register. A first means is provided for decoding a portion of the instruction to generate a configuration signal for selectively configuring the logic elements of the ALU. A second means is provided for decoding the remainder of the instruction to generate a register select signal for selectively actuating a chosen storage element. Two test pins are provided, one placed in the input bus and the other placed in the output bus. The test pins are placed in the test mode by the application of a TEST signal to their terminals. Signals from the test pins will be routed to outside diagnostic or testing equipment. All the storage elements may then be read out or written via these two test points by simply decoding an instruction from the instruction register so as to cause the first decoding means to configure the ALU and the second decoding means to access a particular storage unit. The task of testing the chip is simplified since the ALU may act upon any of the storage elements via the parallel input/output bus lines.

4 Claims, 35 Drawing Figures

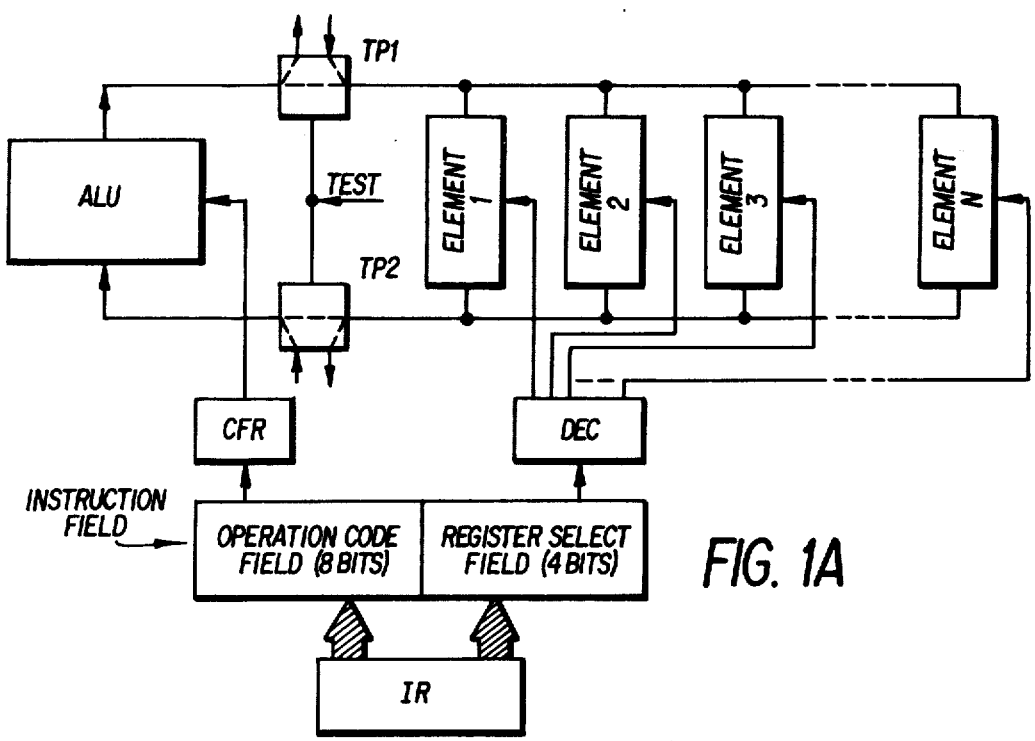
FIG. 1A
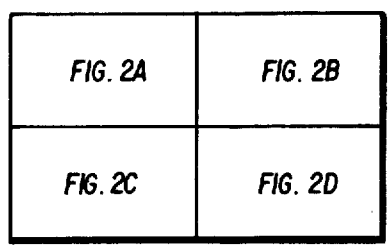
FIG. 2
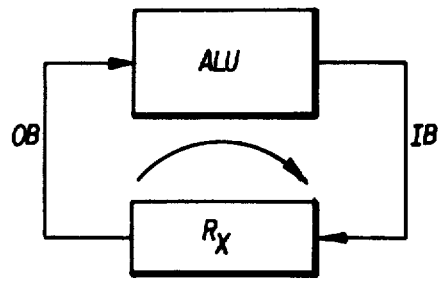
FIG. 3
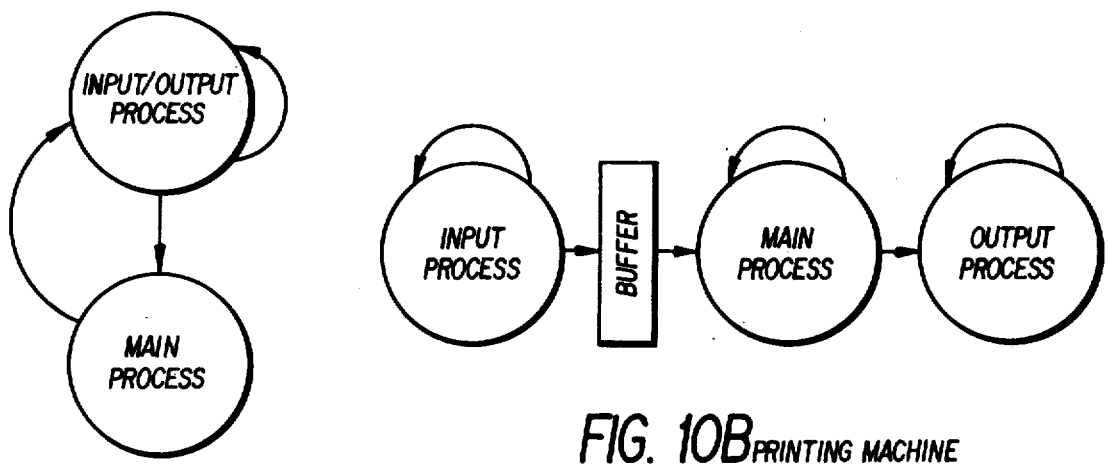
FIG. 10A DISPLAY
FIG. 10B PRINTING MACHINE

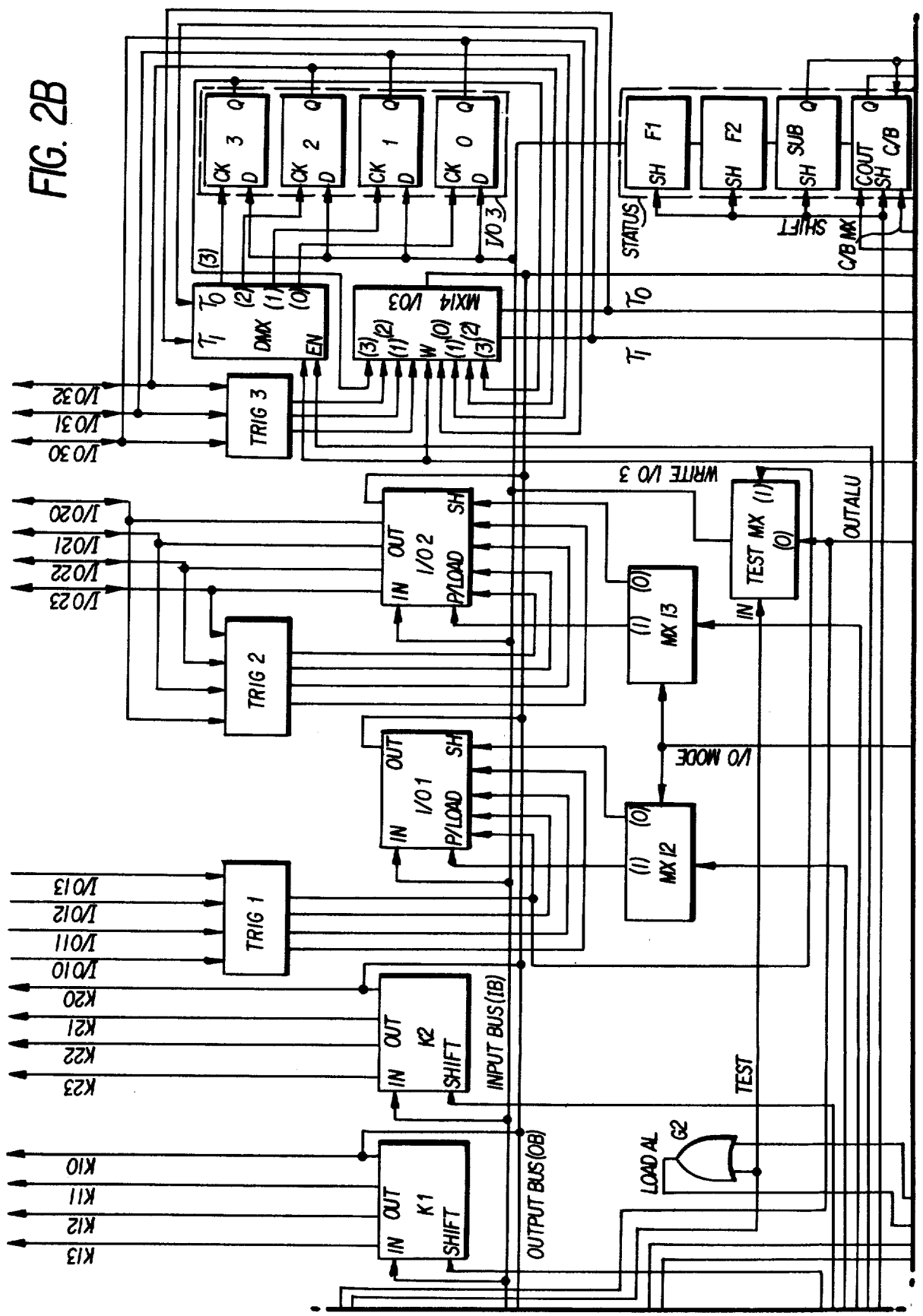

ALU CONFIGURATION FOR SOME INSTRUCTIONS

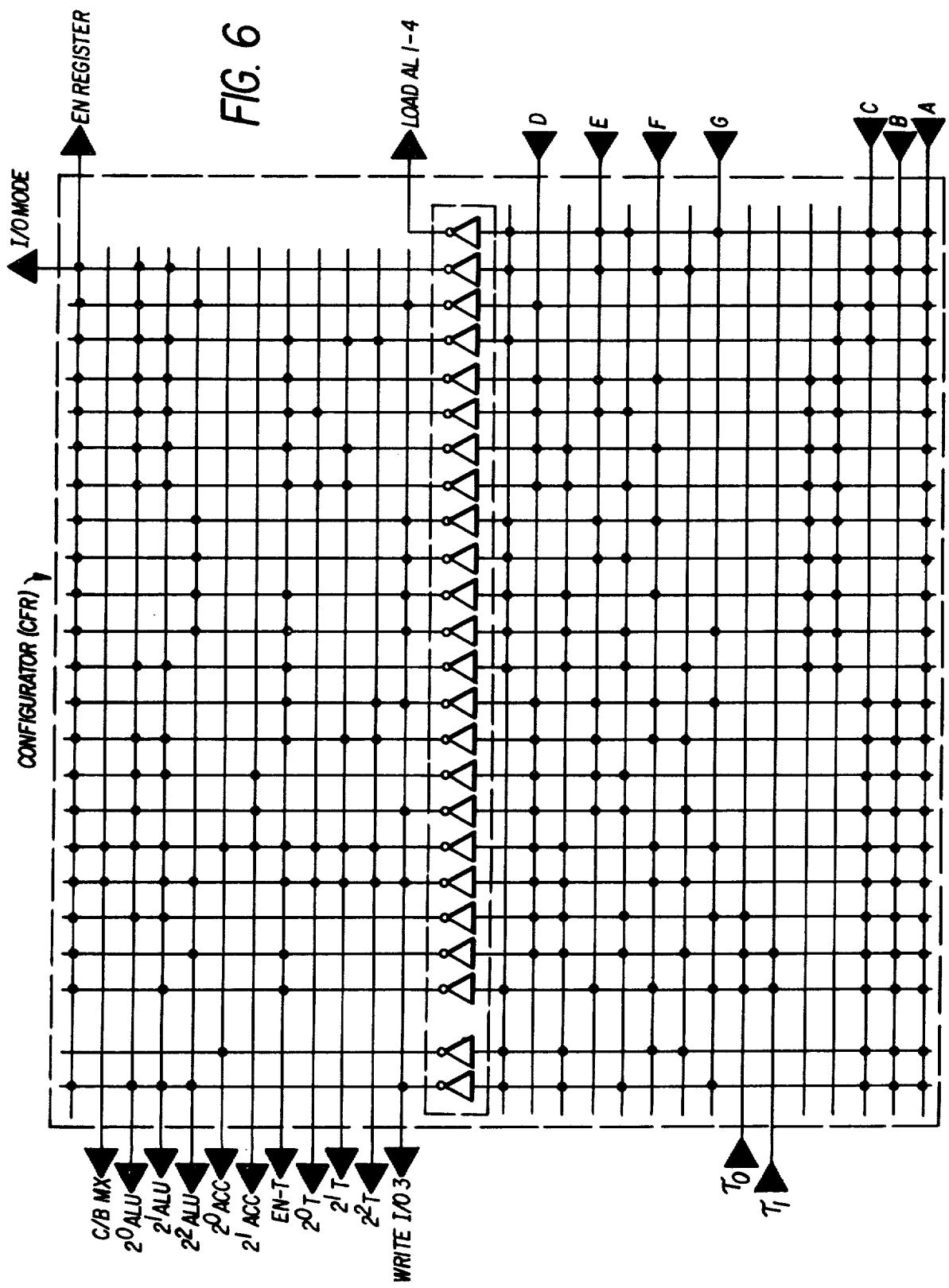

FIG. 7 REPERTOIRE

| ARITHMETIC | NOTE | | |
|---|---|---|---|
| | | $R_X, T \leftarrow$ | $R_X+1,$ CARRY |
| | | $R_X, T \leftarrow$ | $R_X-1,$ BORROW |
| | (1) | $R_X \leftarrow$ | $K$ |
| | | $ACC \leftarrow$ | $R_X$ |
| | | $ACC, R_X \leftarrow$ | $R_X, ACC$ |
| | | $ACC, T \leftarrow$ | $ACC \pm (R_X + C/B), C/B$ |
| | | $R_X, T, C/B \leftarrow$ | IF$(C/B \lor ACC > 9)$ THEN$(ACC \pm 6, 1, 1)$ELSE$(ACC, 0, 0)$ |
| | | $ACC \leftarrow$ | $0$ |

| LOGIC | | | |
|---|---|---|---|
| | (1) | $T \leftarrow$ | $R_X \ne ACC$ |
| | | $T \leftarrow$ | $R_X \ne K$ |
| | | $T \leftarrow$ | $R_{XY}$ |
| | | $T \leftarrow$ | $T$ OR $R_{XY}$ |
| | | $T \leftarrow$ | $T$ AND $R_{XY}$ |
| | | $T \leftarrow$ | $T$ XOR $R_{XY}$ |

| | (1) | $R_{XY} \leftarrow$ | $K$ |
|---|---|---|---|
| | | $R_{XY}, T \leftarrow$ | $T, R_{XY}$ |
| | | $T \leftarrow$ | $R_X(2O2/WS)$ |
| | | $R_X(2O2/WS), T \leftarrow$ | $T, R_X(2O2/WS)$ |

| SHIFT | | | |
|---|---|---|---|
| | (2) | $T, R_{X0}, R_{X1}, R_{X2}, R_{X3} \leftarrow$ | $R_{X0}, R_{X1}, R_{X2}, R_{X3}, T$ |
| | (2) | $T, R_{X0}, R_{X1}, R_{X2}, R_{X3} \leftarrow$ | $R_{X0}, R_{X1}, R_{X2}, R_{X3}, T$ NOT |
| | (2) | $R_{X0}, R_{X1}, R_{X2}, R_{X3} \leftarrow$ | $R_{X2}, R_{X3}, R_{X0}, R_{X1}$ |

| SPECIAL | | | |
|---|---|---|---|
| | | $(R_X, R_{(X \oplus 1)}), MR \leftarrow$ | $MR, (R_X, R_{(X \oplus 1)})$ |

| BRANCH | | | |
|---|---|---|---|
| | (3) | $PP \leftarrow$ | $N$ |
| | (3) | $PP, (MR, STACKS) \leftarrow$ | $N, PP+1$ |
| | (4) | $PP \leftarrow$ | IF$(T)$ THEN$(N')$ELSE$(PP+1)$ |
| | (4) | $PP \leftarrow$ | IF$(T)$ THEN$(PP+1)$ELSE$(N')$ |
| | | $PP \leftarrow$ | $(MR, STACKS)$ |

| I/O | | | |
|---|---|---|---|
| | (5) | $R_X \leftarrow$ | EXTERNAL SETTING |
| | | A LATCHES $\leftarrow$ | $(A_1, A_2, A_3, A_4)$ |
| | | A LATCHES $\leftarrow$ | $0$ |

NOTES
(1) K — CONSTANT — 0-15 OR 0-1 UPON CONTEXT
(2) DO NOT APPLY TO MEMORY AND SCRATCH PAD AND I/O 3
(3) N — 0 — 1023
(4) N' — 0 — 255
(5) APPLY TO I AND I/O2 ONLY

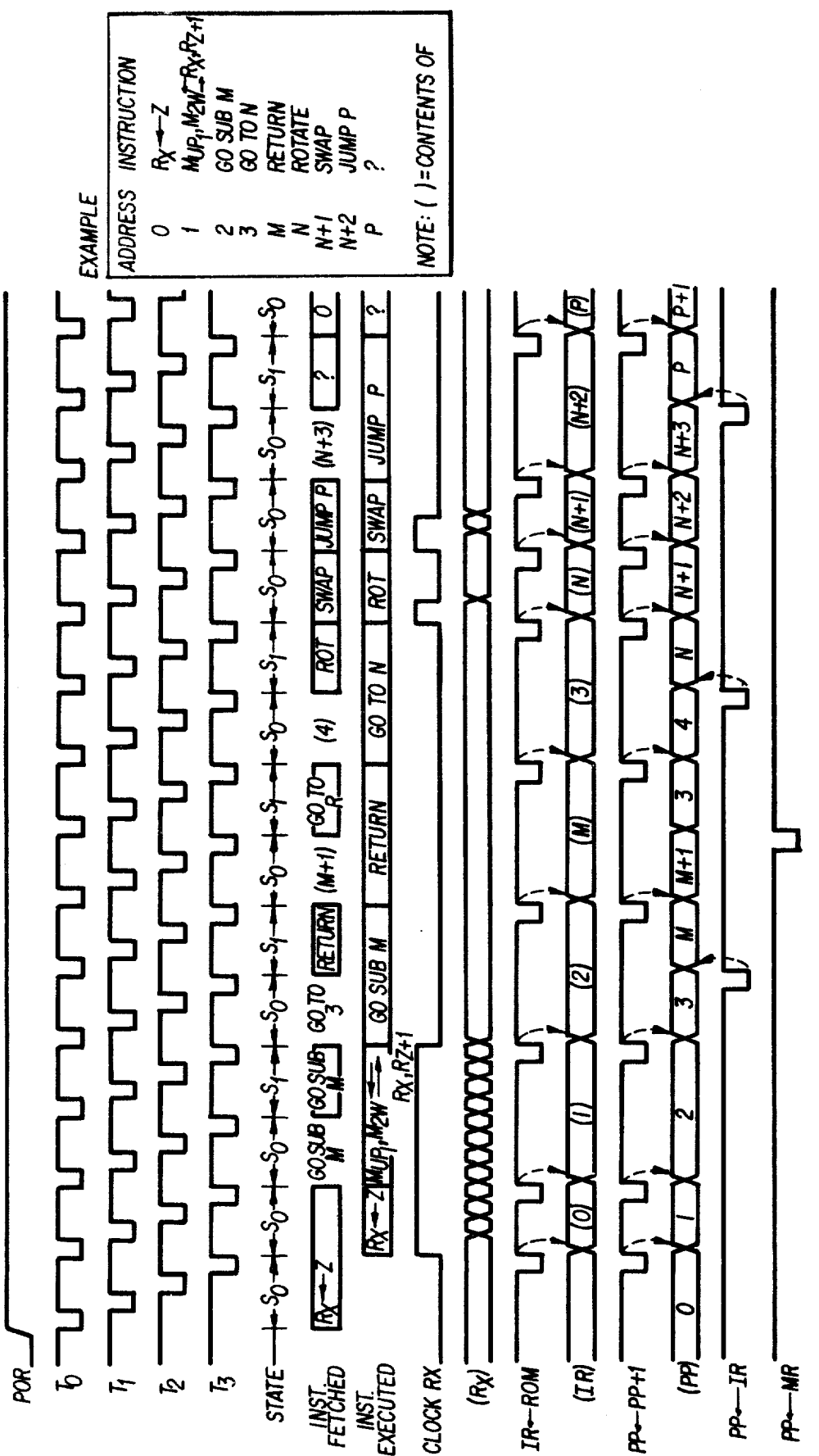
FIG. 9 SYSTEM TIMING DIAGRAM

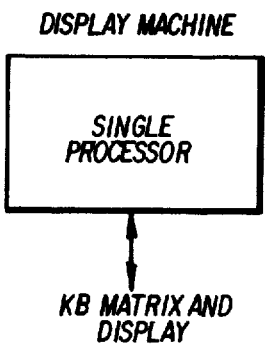
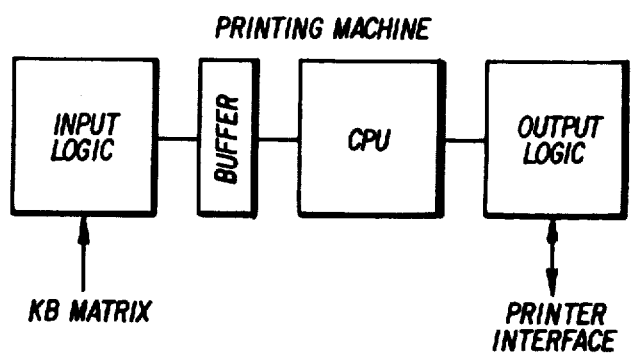
FIG. 11A    FIG. 11B
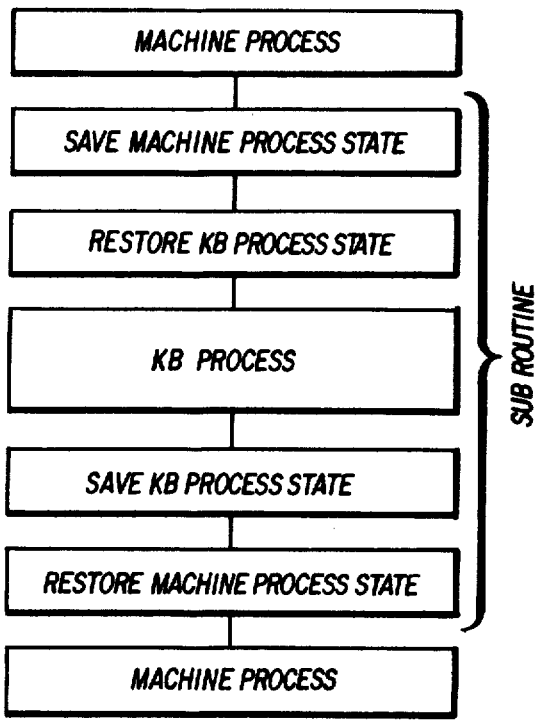
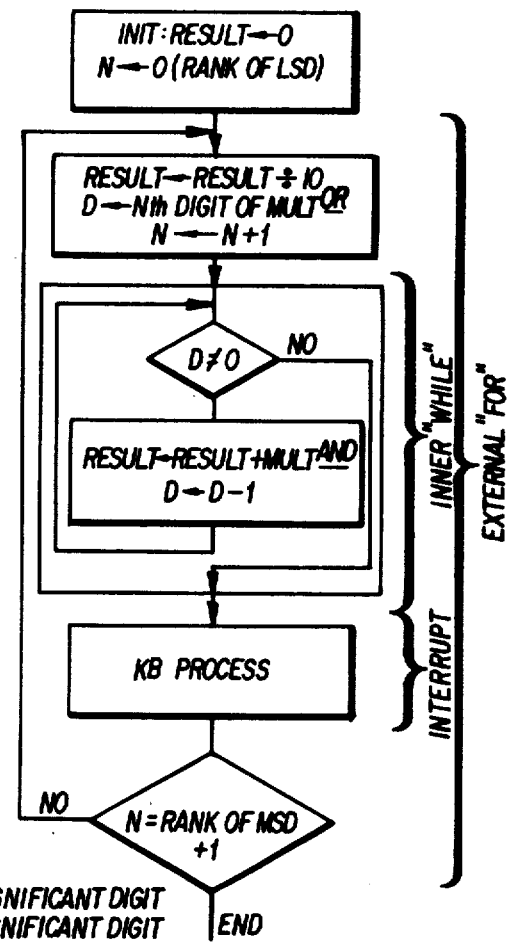
FIG. 12    FIG. 13
NOTE:
LSD = LEAST SIGNIFICANT DIGIT
MSD = MOST SIGNIFICANT DIGIT
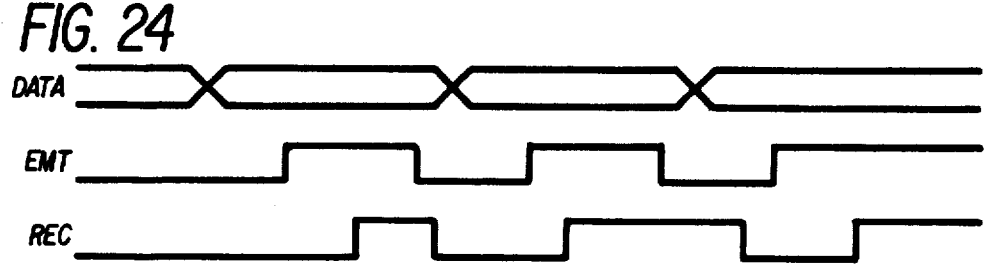
FIG. 24

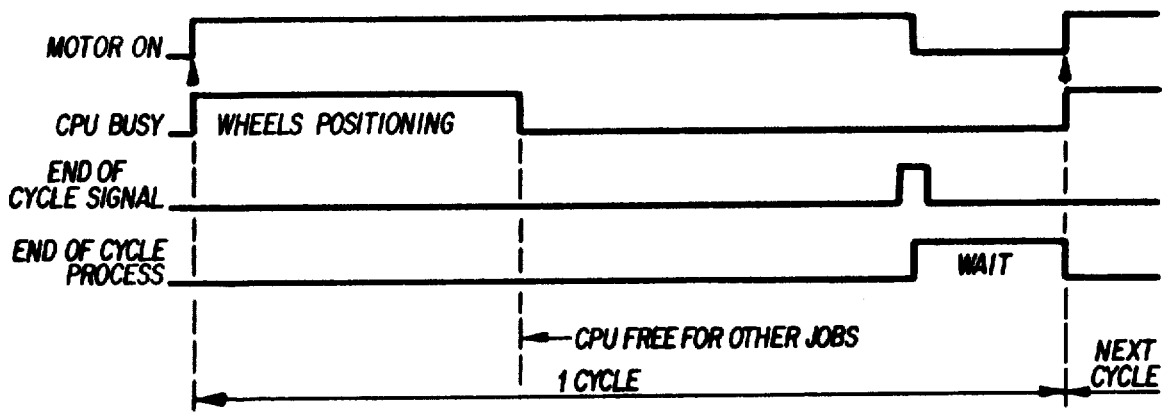
FIG. 16
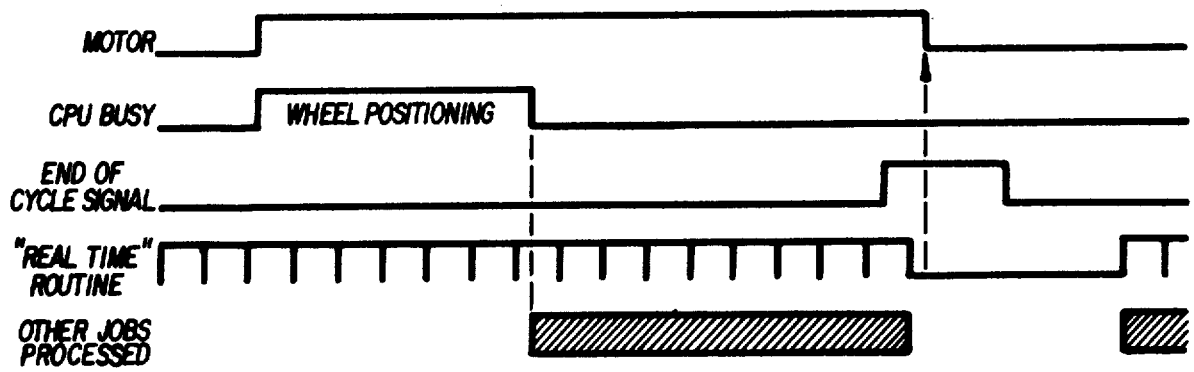
FIG. 18 "REAL TIME" ROUTINE
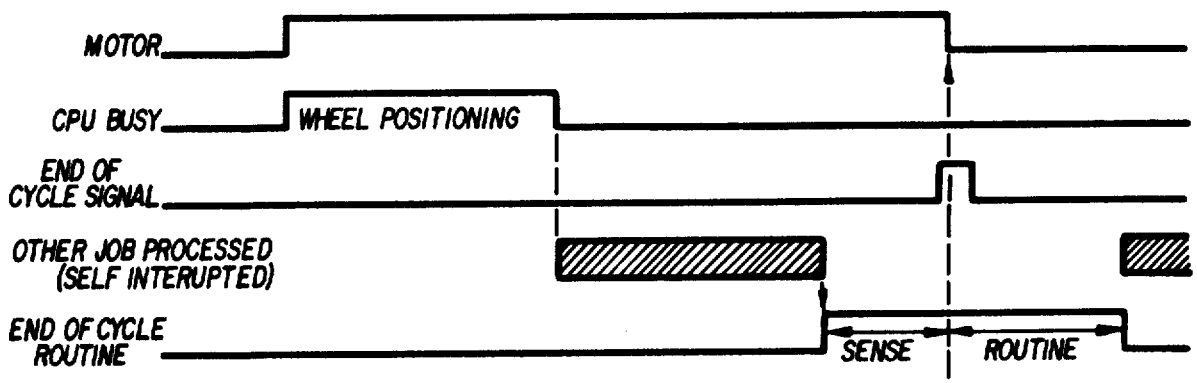
FIG. 19 END OF CYCLE ROUTINE WITH CONTINUOUS SENSE

STRUCTURE FOR AN EASILY TESTABLE SINGLE CHIP CALCULATOR/CONTROLLER

CROSS-REFERENCE TO RELATED APPLICATIONS

This invention is related to the following patent applications filed simultaneously herewith and assigned to the assignee of this application:

Ser. No. 834,928, by Lamiaux, entitled AN ORGANIZATION FOR AN INTEGRATED CIRCUIT CALCULATOR/CONTROLLER, filed Sept. 20, 1977; Ser. No. 834,930, by Lamiaux et al, entitled A CALCULATOR/CONTROLLER ORGANIZATION HAVING SIMULTANEOUS EXECUTE AND FETCH CYCLES, filed Sept. 20, 1977.

BACKGROUND OF THE INVENTION

1. Field of the Invention

The invention relates to the field of microelectronic calculator/controllers and more particularly to a structure for an easily testable single chip calculator/controller.

2. Prior Art

Single chip calculator/controllers and microcomputers are well-known in the art. Such devices can range from relatively simple calculator chips with fixed storage and microroutines up to very powerful and flexible microcomputers capable of handling data processing functions or for use as a resident controller in a large computer system.

The logic organization or architecture chosen for a particular device dictates the size and complexity of fabrication of the resultant chip and the flexibility of its microprogrammed instructions. The more powerful and flexible the logic functions desired, the greater the complexity of the resulting chip. However, with increasing complexity comes increased cost in fabrication and in testing. Oftentimes an entire chip must be discarded because of a single flaw in its fabrication.

Prior art calculator/controller systems generally have included a program storage unit (usually a read only memory) which contains an assembly of instructions, active storage elements (shift registers or a random access memory) the contents of which can be modified by the instructions contained in the program storage unit, and a processing unit which sequences the instructions and modifies the data contents of the active storage elements as specified by the instructions. In prior art devices, the active storage elements are dedicated to specific functions and require specific hardware, control signals, and associated interconnections for their operation.

Testing of LSI calculator chips poses formidable problems: the complexity of the circuitry and interconnections makes diagnostic testing a time consuming affair since literally thousands or millions of possible operating states exist in today's digh density LSI chips. Ease and quality of testing is directly related to the capability to read out and write the status of the various internal storage elements of an LSI calculator/controller chip. One such common prior art method uses a test pin to route the state of the internal storage elements to output pins by means of a multiplexer controlled by the test pin, and route the state of input pins to the active storage element by the same means. This technique, however, cannot be used when the number of active elements is high, as is the case in a single chip calculator/controller.

SUMMARY OF THE INVENTION

These and other objects of prior art devices are overcome in the present invention by providing a structure for an easily testable single chip calculator/controller comprising an arithmetic logic unit and a plurality of active storage elements all interconnected in parallel via an input but and an output bus. Instructions contained in a program storage means are read out into an instruction register in response to signals from a control means. A first means is provided for decoding a portion of the instruction to generate a configuration signal for selectively configuring the logic elements of the arithmetic logic unit. A second means is provided for decoding the remainder of the instructions to generate a register select signal for selectively actuating a chosen storage element. Two test pins are provided, one placed in the input bus and the other placed in the output bus. The test pins are placed in the test mode by the application of a TEST signal to their terminals. Signals from the test pins will be routed to outside diagnostic or testing equipment. All the storage elements may then be read out or written via these two test points by simply decoding an instruction from the instruction register so as to cause the first decoding means to configure the arithmetic logic unit and the second decoding means to access a particular storage unit. The task of testing the chip is simplified since the arithmetic logic unit may act upon any of the storage elements via the parallel input/output bus lines.

BRIEF DESCRIPTION OF THE DRAWINGS

Other features and advantages of the present invention are presented in the following detailed description of the preferred embodiment and illustrated in the accompanying drawings, wherein:

FIG. 1A is a block diagram of the instruction field configuration and decoding system of the invention;

FIG. 3 is a block diagram showing the data flow along the input bus and output bus of the invention;

FIG. 6 shows in more detail the Configuration unit of FIG. 2D;

FIG. 7 is a table showing the instruction repertoire which may act upon the auxiliary registers STACK 1 and STACK 2 shown in FIG. 2C;

FIG. 9 is a timing diagram for typical instructions employed with the present invention;

FIGS. 10A and 10B are generalized functional diagrams of the processes of the present invention as used in a display-type calculator and a printing type calculator, respectively;

FIGS. 11A and 11B are generalized functional diagrams illustrating prior art methods for processing information in display-type calculators and printing-type calculators, respectively;

FIG. 12 illustrates a simplified keyboard sampling routine which could be used in the present invention;

FIG. 13 illustrates a multiplication routine used in the present invention;

FIG. 16 is a chart showing the timing of the various processes of FIG. 15B;

FIG. 18 illustrates the timing of the various processes of FIG. 17 utilizing a "real-time" routine;

FIG. 19 illustrates the timing of the various processes of FIG. 17 utilizing an "end-of-cycle" routine with continuous sense;

FIG. 24 shows an asynchronous (handshaking) communication scheme for use with the multi-chip system shown in FIG. 23;

DESCRIPTION OF THE PREFERRED EMBODIMENT

Figure 1:
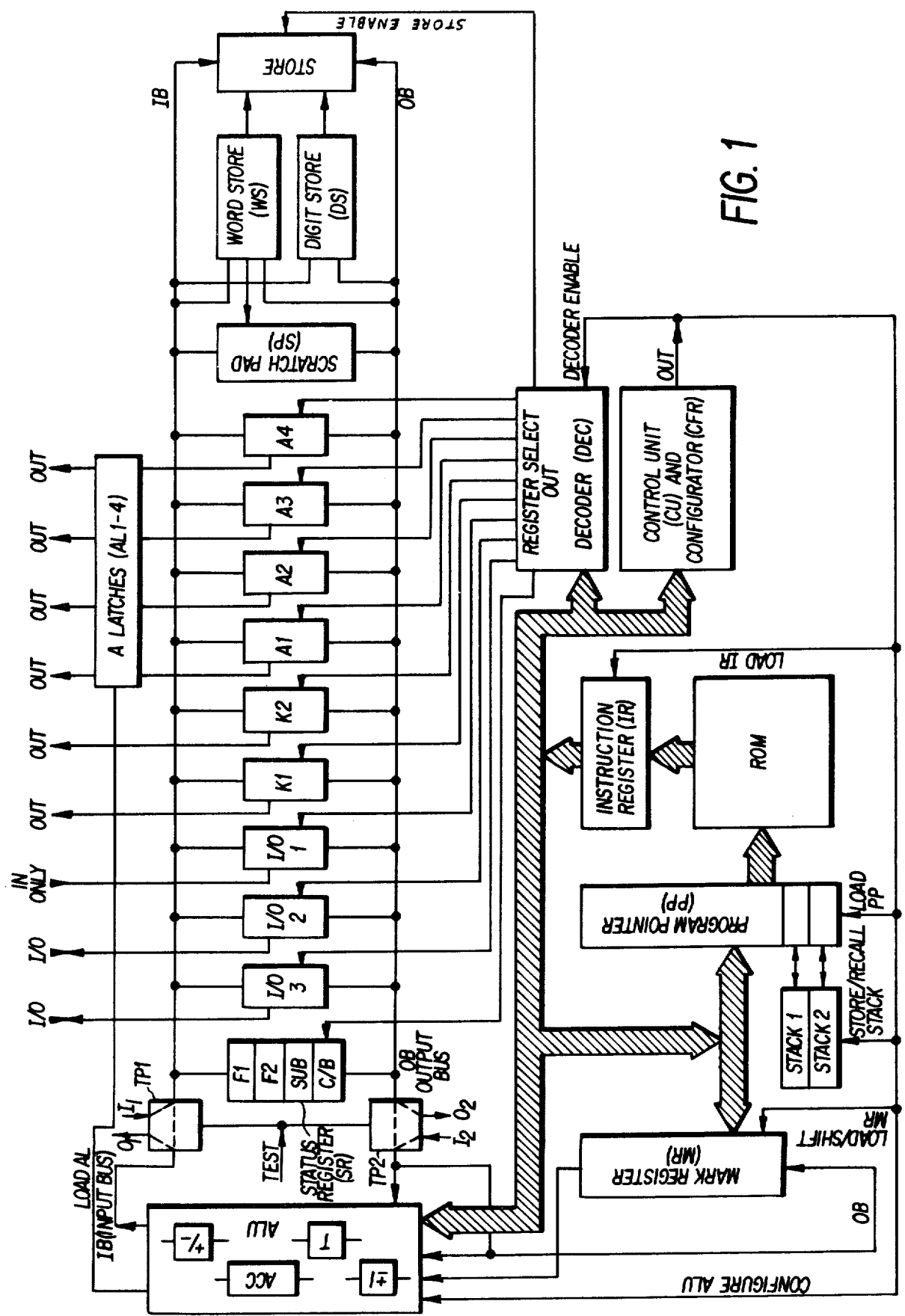
FIG. 1 is a block diagram of the organization of the present invention.

Referring to FIG. 1, there is shown a block diagram of the organization of the single chip LSI calculator/controller system of the present invention. The calculator/controller is arranged as a microprogrammed four-bit serial system, needing only a single voltage source.

The single chip controller comprises an Arithmetic Logic Unit (ALU) and a plurality of four-bit general purpose active storage elements (I/O1-3, K1, K2, A1-4, Status Register) where the ALU and the storage elements are all interconnected in parallel via an input bus (IB) and an output bus (OB). Also connected in parallel across the IB and OB are several special purpose registers including a 4×4 bit (four digits of four bits each) Scratch Pad (SP), a four-bit Word Select (WS) register, a four-bit Digit Select (DS) register, and a 4×16×4 bit (4 words of 16 4-bit digits) memory unit (STORE).

The Status Register (SR) has two general purpose flag bits, F1 and F2, a SUB bit for placing the Adder/Subtractor (+/−) of the ALU in the Subtract mode, and a C/B (Carry/Borrow) bit. The WS may also communicate with the SP and the STORE elements of the device. Additionally, the DS element can read in its four bits of stored digits into the STORE element upon proper command. All active storage elements are only capable of shifting out their contents on the OB while shifting in the contents of the IB when their "Register Select" signal comes true (see below).

Six of the general purpose registers, K1, K2 and A1-A4 are designated output elements only. K1 and K2 are connected directly to their output lines, while elements A1 through A4 are connected to their respective A latches (AL1-4) which must be activated by an appropriate control signal from the ALU before data in these registers will be read out. Register I/O-1 is an input only register, while registers I/O-2 and I/O-3 allow data to be read both in and out.

Also provided is a first Test Port (TP1) having input/output lines (I1, O1) placed along the IB, and a second Test Port (TP2) having input/output lines (I2, O2) placed along the OB. TP1 and TP2 are connected together by a TEST line, which serves to actuate both TP1 and TP2 when testing of the controller system is desired. It will be noted that the application of a signal to the TEST line will cause all signals along the IB and OB to be routed through I1, O1 of TP1 and I2, O2 of TP2, respectively. The signals from I1, O1, and I2, O2 would be applied to well-known LSI chip diagnostic or testing equipment (not shown). This testing arrangement is an important feature of the invention, which will be discussed in more detail below.

A Read Only Memory (ROM) is provided for storing various instructions which control the operation of the calculator/controller system. The ROM can accommodate 800 12-bit words. The ROM is addressed by a Program Pointer (PP) which can be incremented or loaded either from the Mark Register (MR) for a Return Instruction, or from the Instruction Register (IR) for a Branch Instruction. The MR is 8-bits wide, but has an additional 2 bits of hardwired storage, designated STACK 1 and STACK 2 which may communicate with the PP. The PP can accommodate up to a 10-bit word. The MR can be loaded from the PP, to store the return link of a subroutine. The MR may also communicate with the active storage elements via the OB under certain conditions. The MR may thus be modified by the data contents of the system. Additionally, the PP may be addressed by either STACK 1 or STACK 2 for purposes of subroutine entry and exit. Both the MR and the PP may communicate directly with the ALU under certain conditions.

A Control Unit (CU) and a Configurator Unit (CFR) are provided for controlling the operation of the system and for selectively arranging the elements of the ALU, respectively, in response to an instruction from the IR. A portion of an instruction in the IR is also applied to the Decoder (DEC), for selectively actuating the active storage elements as will be described below.

A primary feature of the present invention is that all the logic necessary to perform a function (i.e. modification of the contents of one element) is centralized in the ALU. The ALU has a number of self-contained logic functions, for example an INCREMENT/DECREMENT circuit (±1), a 4-bit accumulator (ACC), Add/Subtract (+/−), and a one-bit Boolean Accumulator (T). With this logic arrangement, for example, only one Increment/Decrement circuit is needed to allow all elements to perform as counter/decounter. These and other logic elements of the ALU may be reconfigured by a signal applied by the CFR in response to the operation code field of a word in the IR; this ability to reconfigure the logic elements of the ALU in response to the operation code field of a word in the IR constitutes an important feature of the invention.

Referring to FIG. 1A, there is shown a block diagram of the unique instruction configuration and decoding system of the present invention. An instruction from the IR is typically, but not limited to, 12 bits in length. As shown in FIG. 1A, the typical instruction field of the present invention includes an Operation Code field of 8 bits and a Register Select field of 4 bits. The Operation Code field of the instruction is applied to the CFR unit which, responsive thereto, configures the logic elements of the ALU. Similarly, the Register Select field of the instruction is applied to the DEC unit which decodes the instruction and selects which of the active storage elements, indicated generally as elements 1, 2, i, . . . n. These elements correspond generally with those elements shown in FIG. 1 as I/O1-3, K1, K2, and A1-4. It can be seen that with the organization of the logic and storage elements of the present invention any instruction can act upon the data contents of any active storage element. Further, the number of logic gates needed for large scale integration is minimized, since once a combinational circuit is designed, it can be used to perform on the data contents of any active storage elements, thus eliminating the need for duplicate circuitry that would otherwise be necessary to perform the same functions. This logic arrangement also has the added benefit that only one control signal, a "Register Select (Shift)" signal, is needed for each active storage element.

With reference to FIGS. 2A-2D there is shown a detailed diagram of the preferred embodiment of the present invention. The invention is a microprogrammed 4-bit serial calculator/controller system. The instruction repertoire is designed such that minimal hardware is used to perform arithmetic and logical operations on the STORE, the store address registers (WS and DS) and the general purpose registers. (I/O1-3, K1, K2, A1-4). The hardware provides one level of automatic subroutine linkage. Additional levels may be realized by program with a special instruction which stores return links either in memory (STORE or SP) or any other free register.

System operation is simple in that a single event is allowed at a given time. An instruction contains two fields: the first, the Register Select field, selects a register, either one out of two digits of the STORE, the addresses of which are contained in the store address registers (DS, WS) or one of the store address registers and one of the I/O or general purpose registers; the second field, the Operation Code field, configures the ALU for that instruction. The content of the selected register is shifted on the OB, modified by the ALU, and shifted back into the register on the IB.

The general form of an instruction is:

$$R_x, \text{ALU STATE} \leftarrow \text{FUNCTION} (R_x, \text{ALU STATE})$$

where $R_x$ is the selected register, and ALU STATE is the state of the arithmetic accumulator (ACC), the Boolean accumulator (T), or a hard-wired flip-flop such as a Carry/Borrow (C/B).

Sequencing is accomplished by incrementing the Program Pointer (PP) upon completion of an arithmetic or logical instruction, or by means of conditional branching and subroutine instructions.

Figure 2A:
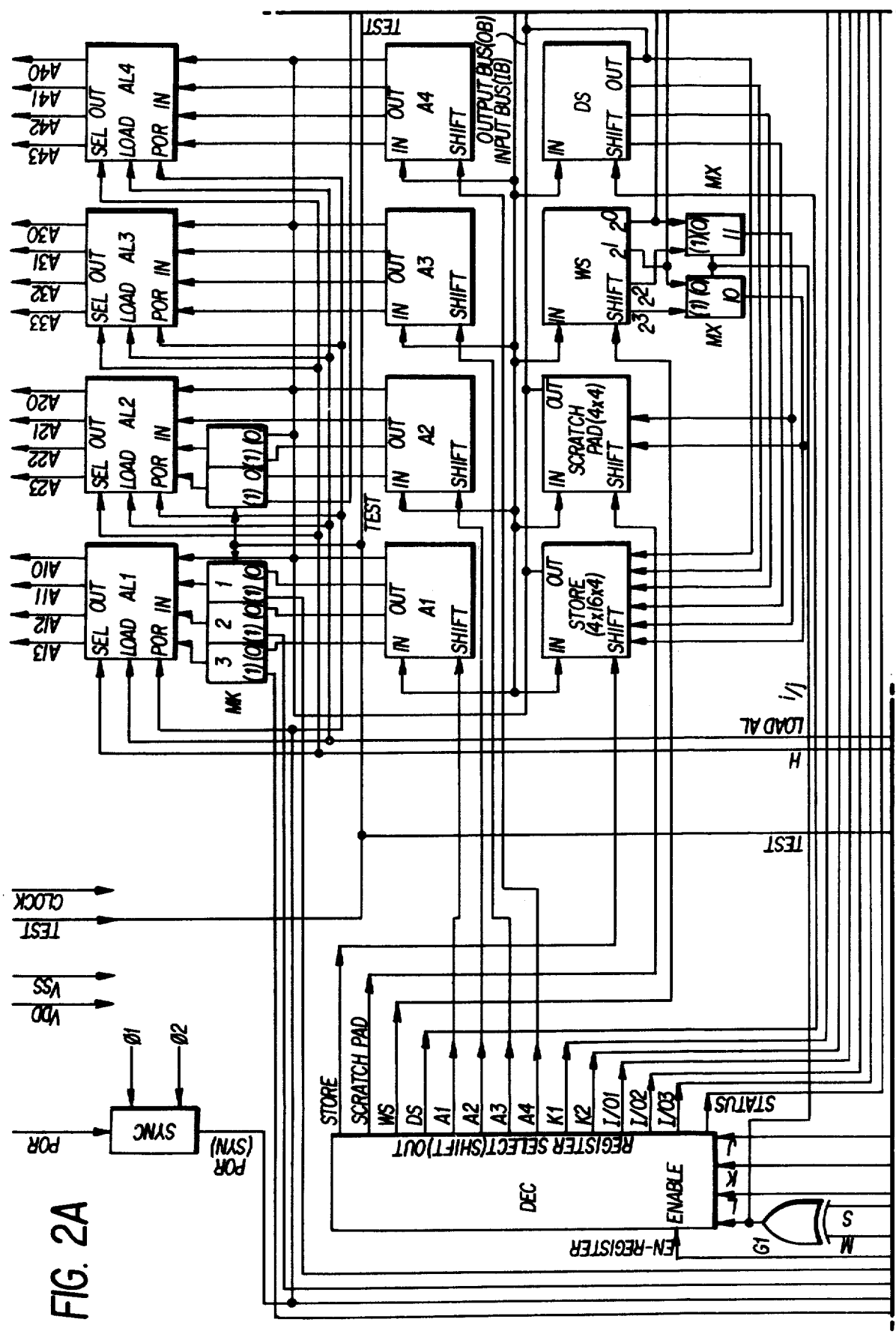
FIG. 2, comprised of FIGS. 2A, 2B, 2C, and 2D, shows in detail an illustrative embodiment of the present invention.

With reference to FIG. 2A there is shown the addressing structure for the STORE (memory), SCRATCH PAD (SP), and the store address registers (DS, WS).

The STORE and SP use the same addressing structure: the STORE contains 256 bits of random access memory (RAM), organized as four words of 16 4-bit digits, while the SP contains 4 digits of 4 bits each. The addressing structure allows for 8 words of 16 digits each, 4 words out of 8 being directly accessible by an instruction. The SP serves no specific purpose, but can be thought of as the kernel of another 256 bit memory. In actual practice, the STORE and SP could be combined together in a single 1K static RAM, such as the Intel 2101; of course similar units well-known to those who work in the microprocessor art could be used instead.

The STORE and SP are addressable digit by digit: a reference (Register Select/SHIFT) to the STORE or SP will shift serially the contents of the designated digit onto the OB, while a new content (if present) will be shifted onto the IB and written in the same location. This feature (simultaneous read/write operation) is particularly useful for the data manipulation involved in a desk calculator.

A 6-bit address is given by the two store address registers: DS (Digit Select) 4 bits, and WS (Word Select) 2 bits. Both the DS and WS registers are 4-bit parallel access shift registers, for example Texas Instruments Part No. 74195 (this and all other references to Texas Instruments circuits come from the Texas Instruments TTL Handbook, 1977 ed., it being understood that these references are by way of example only and that the practice of the present invention is not in any way being limited thereto). Since WS is a 4-bit register, a bit $(i/j)$ applied to a pair of identical 2 line to 1 line multiplexers labeled MX10 and MX11 from the Register Select field (Register Select/SHIFT from DEC) will select either the two most significant bits of the WS or the two less significant bits, to address the STORE.

The Register Select field of an instruction (see FIG. 1A) can therefore reference:

STORE $(i)$: the digit of the memory designated by the DS and $2^0$ WS, $2^1$ WS;

STORE $(j)$: the digit of the memory designated by the DS and $2^2$ WS, $2^3$ WS;

SP $(i)$: the digit of the SP designated by $2^0$ WS, $2^1$ WS;

SP $(j)$: the digit of the SP designated by $2^2$ WS, $2^3$ WS;

WS: Word Select address register;

DS: Digit Select address register.

The ability to access two different locations of the memory without changing the contents of the address registers (DS, WS) is an aid in programming dyadic (paired) operations. Indeed, since the DS register is not automatically incremented or decremented by a memory cycle, this allows greater flexibility in implementing a given data organization with little cost in terms of execution time and number of program steps.

With reference to both FIGS. 2A and 2B there are shown 10 identical 4-bit registers (I/O1-3, K1, K2, A1-4, STATUS) which can be used during a computation operation or as I/O (input/output) registers during an INPUT/OUTPUT operation. These registers could be, for example, TI 74195 4-bit parallel access shift registers. Since all registers are identical and may be used as general purpose registers during computation or as I/O registers during an I/O operation, it can be seen that this organization allows maximum flexibility and utilization of the resources of the calculator/controller system and thus forms an important feature of the present invention.

The A registers, A1, A2, A3, A4, are used as output registers only and feed the A latches, AL1, AL2, AL3, AL4, respectively. All four latches are identical and may be TI 74195 4-bit parallel access shift registers, for example. The contents of an A register can be loaded into its corresponding output latch by an appropriate instruction (LOAD AL) from the Configuration Unit (CFR, FIG. 2D). The time needed to set up a given bit pattern into the corresponding output ports (A10-13; A20-23; A30-33, A40-43) is thus made invisible to the output device (printer, display, etc.). The A latches can also be cleared by an instruction from the IR via line H (see FIG. 2C) applied to the respective CLEAR terminals of AL1-4.

The two K registers, K1 and K2 shown in FIG. 2B, have parallel outputs which drive directly the output ports, K10-13 and K20-23, respectively. An instruction which selects the K registers will serially shift their contents; therefore the output ports will be unstable during the execution time.

The I/O-1 register is an input-only register which can be loaded, via its associated four-input trigger circuit TRIG 1, with the data or signals being externally applied to input ports I/O10-13.

The I/O-2 register is associated with bi-directional ports I/O20-23 and can be loaded in parallel similarly to I/O-1 via its trigger circuit TRIG 2. During the execution of other instructions referencing I/O-2, ports I/O20-23 are unstable (serial shift). The data contents of I/O-2 may also be shifted out directly along ports I/O20-23. The state of the I/O-2 ports is the result of a "wire-or" (positive true logic) of the internal contents of I/O-2 and the value externally assignedtto these ports. Two multiplexers, MX12 and MX13 are associated with I/O-1 and I/O-2, respectively. MX12 and MX13 are two input-two output multiplexers, arranged in a 4 NAND gate array and serve to select either the serial shift mode (SHIFT), or the parallel load mode (P/LOAD) of shift register I/O-1 and I/O-2 in response to a Register Select/SHIFT signal applied from the DEC and an I/O MODE signal from the CFR.

Register I/O-3 is also associated with 3 bi-directional ports I/O30-32 and can be loaded in parallel similarly to I/O-2 via its trigger circuit TRIG 3. A READ instruction reads the state of ports I/O30-32 as the result of the "wire-or" of the contents of register I/O-3 and the external conditions. A READ instruction does not affect the contents of the register. Unlike I/O-2, the state of the ports remain stable during execution time. An input signal through ports I/O30-33 will be applied to the inputs of MX14, an N-line-to-1-line multiplexer, such as the TI 74151. The output of MX14 is connected to the OB. The output of the 4 1-bit registers of I/O-3, besides being connected to output ports I/O30-33, are also connected to the inputs of MX14. MX14 is controlled by an input signal from the CFR (FIG. 2D) applied along the line labeled WRITE I/O-3. MX14 is clocked by the two inputs labeled $\tau_1$, $\tau_0$ from the CLOCK GENERATOR.

Demultiplexer DMX is a dual 2-line-to-4-line demultiplexer, for example the TI 74155. DMX is turned on at its ENABLE input by a Register Select signal from the DEC (FIG. 2A). DMX also receives an input signal from the CFR via the line labeled WRITE I/O-3, and 2 clocking signals via lines $T_1$, $T_0$ from the CLOCK GENERATOR (FIG. 2D). The output from the DMX (DMX-0,1,2,0,1,2, and 3 in FIG. 2B. The other inputs to cells 0,1,2, and 3 of I/O-3 come from the IB. I/O-3 is a 4-bit parallel access shift register, such as the TI 74195.

The STATUS register has no I/O function, but contains two general purpose flags, F1 and F2, and the status flip-flops, Carry/Borrow (C/B) and SUB (sets the Adder/Subtracter in the Subtract mode). The STATUS register can be a 4-bit parallel access shift register, such as the TI 74195.

All the above registers are addressable by the Register Select field of an instruction (see FIG. 1A) which has been decoded by the DEC. All the above registers may be selected by an appropriate Register Select (SHIFT) signal from the DEC and applied to their respective SHIFT inputs. Contents of the IB are placed into the selected registers via the IN inputs of each 4-bit register. The contents of a particular register are moved out along the OB via the OUT outputs of the registers.

A total of 16 registers (or digits) are directly accessible by an instruction: 2 digits of STORE; 2 digits of SP; WS; DS; and the IO I/O or general purpose registers, A1-4, K1, K2, I/O1-3, and STATUS. These 16 registers (digits) are called $R_x$ in the following discussion ($x$ ranging from 0 to 15); $R_{xy}$ designates the bit number $y$ of $R_x$ ($y$ ranging from 0-3).

Turning to FIG. 3, the ALU can be thought of as a transfer function between the output bus and the input bus. As a register $R_x$ is selected its contents are shifted on the OB, modified by whatever function the ALU has been configured (programmed) for by the Operation Code of an instruction (see FIG. 1A), and shifted on the IB into the selected register. Some operations may also be used to change the state of the ALU (e.g. the contents of the arithmetic accumulator ACC or the Boolean accumulator T) or the Carry/Borrow flip-flop C/B (part of the STATUS register).

Referring to FIG. 2D the ALU contains a serial binary Adder/Subtractor circuit with carry/borrow (+/−), a serial binary INCREMENT/DECREMENT circuit (±1), a 4-bit arithmetic accumulator ACC, a one-bit Boolean accumulator T, and the necessary data routing and clocking circuits. An ALU multiplexer unit MX(ALU) is also provided which acts as an interface between the ALU logic elements and the IB. The MX(ALU), may be for example, an N-line-to-1-line multiplexer such as the TI 74151. The output of MX(ALU) is along the line labeled OUTALU in FIG. 2D and is applied to the TEST multiplexer TESTMX (FIG. 2B). The output of the TESTMX is applied to the IB. TESTMX is a 2-input-to-1 output multiplexer which may be selectively activated by a signal applied to its input along the TEST line. Connected to the inputs of MX(ALU) are the arithmetic accumulator ACC, the Adder/Subtractor (+/−) the Increment-/Decrement circuit (±1) and the one-bit Boolean accumulator T. Also connected to the inputs of MX(ALU) are the OB and one cell of the 8-bit Mark Register MR.

The ACC may be, for instance, a 4-bit parallel access shift register, such as the TI 74195. There is a Carry or Remainder logic (LOG-COR) associated with one of the outputs of the ACC which may also be a 4-bit register. Input to the ACC is via the accumulator multiplexer MX(ACC), which may be a dual 4-line-to-1 multiplexer such as the TI 74153. Inputs to MX(ACC) are from the CFR via lines $2^1$ACC, $2^0$ACC and from the Adder/Subtractor (+/−) via the SUM 1 line. The Adder/Subtractor (+/−) has inputs from the Y line, the $Y_i$ line (X input of Adder/Subtractor) and the $C_i$ line. The Y line of the Adder/Subtractor is connected to one input of MX7, to one input of MX(ACC) and to the output line of the ACC as shown in FIG. 2D. Input X of the Adder/Subtractor is connected to MX8, a 2-line-to-1-line multiplexer. Inputs to MX8 are from the "0 or 6" output line of LOG-COR and directly from the OB. The LOG-COR is similar in construction and function to the ACC. MX8 is controlled by a control signal applied along line G from the IR (see FIG. 2C). One output of the Adder/Subtractor (SUM 1) is applied to both MX(ACC) and MX(ALU); the other output line ($C_{01}$) is applied to LOG-COR and to MX9. MX9, a 2-line-to-1-line multiplexer, receives its other inputs from the TENS output of LOG-COR. The output of MX9 is applied to both MX(T) [the T multiplexer]and to the C/B element of the STATUS register (FIG. 2B) via the line labeled $C_{out}$. MX9 is controlled by a signal from gate G11. The output of element C/B of the STATUS register is applied to gate G10, which in turn is connected to input $C_i$ of the Adder/Subtractor. The other input to G10 is from gate G9 which has inputs from terminal $T_0$ of the CLOCK GENERATOR and line G of the IR. The output line G of the IR is also applied to the input of gate G11, with the other input of G11 being from terminal $T_3$ of the CLOCK GENERATOR. When both inputs of G10 come true, a Carry-Borrow inhibit signal will be generated (on clock cycle $T_0$) and applied to input $C_i$ of Adder/Subtractor for a CARRY OR BORROW operation. Likewise, when both inputs of G11 come true, a control signal will be applied to MX9 to indicate that the contents of the "TENS" output of LOG-COR should be applied to both T and element C/B of the STATUS register, at the end of the CARRY OR BORROW operation (on clock cycle $T_3$).

The Increment/Decrement circuit ($\pm 1$) shown in FIG. 2D is similar in construction to that of the Adder/Subtractor ($+/-$) discussed above. The Increment/Decrement circuit has an input $C_i$ (Carry-IN) connected to the output of the one-bit Boolean accumulator T. Input Y is connected directly to output $T_0$ of the CLOCK GENERATOR. Input X is connected to the OB line. A control signal from the IR via line H is applied to the I/D input in order to set the circuit in the Increment or Decrement mode. Outputs of the Increment/Decrement circuit are from terminal $C_0$ (Carry Out) along line $C_{02}$ to an input of the T multiplexer MX(T), and from terminal S via the SUM 2 line to an input of MX(ALU).

The K multiplexer MX(K) receives four inputs, labeled 0,1,2 and 3, via lines E,F,G, and H respectively, from the IR. MX(K) may be dual 4-line-to-1-line multiplexer, such as the TI 74153. MX(K) has two clocked inputs $\tau_1$ and $\tau_0$ which are connected to terminals $\tau_1$ and $\tau_0$ respectively of the CLOCK GENERATOR. The output of MX(K) is applied both to an input of MX(ALU) and to one input of MX7.

MX7, a 2-line-to-1-line multiplexer receives its other input from the output of the ACC. MX7 is controlled by a signal from the IR applied along line C. The output of MX7 is applied directly to the LOG COMPARATOR unit which is a 4-line-to-1-line multiplexer similar to MX(K), above. The other inputs to the LOG COMPARATOR are from the OB, from the output of the CLOCK GENERATOR via line $T_0$, and from the output of the one-bit Boolean accumulator T. The output of the LOG-COMPARATOR is applied directly to an input of the T multiplexer MX(T).

MX(T) is an N-line-to-1-line multiplexer, such as the TI 74151. Besides the input from the LOG COMPARATOR, MX(T) has six other inputs: an input directly from the OB, an input from OR gate G6, an input from AND gate G7, an input from NOR gate G8, an input from the output of MX9 via line $C_{OUT}$, and an input from the INCREMENT/DECREMENT circuit via line $C_{02}$. Gates G6, G7 and G8 all have one of their inputs from the OB and their other input tied to the output of the one-bit Boolean accumulator T. The operation of MX(T) is controlled by signals applied to terminals $2^0$, $2^1$, and $2^2$ of MX(T) via lines $2^0T$, $2^1T$, $2^2T$ from the CFR. The output of MX(T) is applied directly to the one-bit Boolean accumulator T.

The one-bit Boolean accumulator T comprises a single cell shift register, such as the TI 74195, with a clocked input CK from AND gate G5. G5 has two inputs, one from the output of MX3, and the other from the CFR via the control line labeled "EN-T" (Enable T) in FIG. 2D. The output of T is applied to one input of MX2, input $C_i$ of the INCREMENT/DECREMENT circuit ($\pm 1$), and to MX (ALU) after being inverted by inverter $I^1$.

The other input to the 2-line-to-1-line multiplexer MX2 is from the IR via line F. MX2 is controlled by a signal connection from the IR by means of line E. The output of MX2 is applied to one input of 2-line-to-1-line multiplexer MX1. The other input of MX1 is connected to the OB. MX1 receives a control signal from the output of MX3. The output of MX1 is connected directly to one input of MX(ALU).

MX3 is a 2-line-to-1-line multiplexer having one input connected to a voltage source $V_{DD}$ and the other input connected to the output of the LOG circuit. The operation of MX3 is controlled by a signal from the IR via line C. LOG is a 2-line-to-1-line multiplexer having one input connected to the output of multiplexer MX4 and the other input connected to the output of multiplexer MX5. The operation of the LOG circuit is controlled by control signals applied to terminals $\tau_1$, $\tau_0$ from the CLOCK GENERATOR.

Both MX4 and MX5 are 2-line-to-1-line multiplexers. One input of MX4 ($2^{1*}$) is connected to the output of the WS labeled "$2^1$". The other input of MX4 ($2^1y$) is connected to the IR via control line G. Similarly, one input of MX5 ($2^{0*}$) is connected to the output of the WS labeled "$2^0$". The other input of MX5 ($2^0Y$) is connected to the IR via control line H.

The general form of an instruction for the ALU is:

$R_x$, ACC, T, C/B ← FUNCTION ($R_x$, ACC, T, C/B);

see also FIG. 3.

Figure 4:
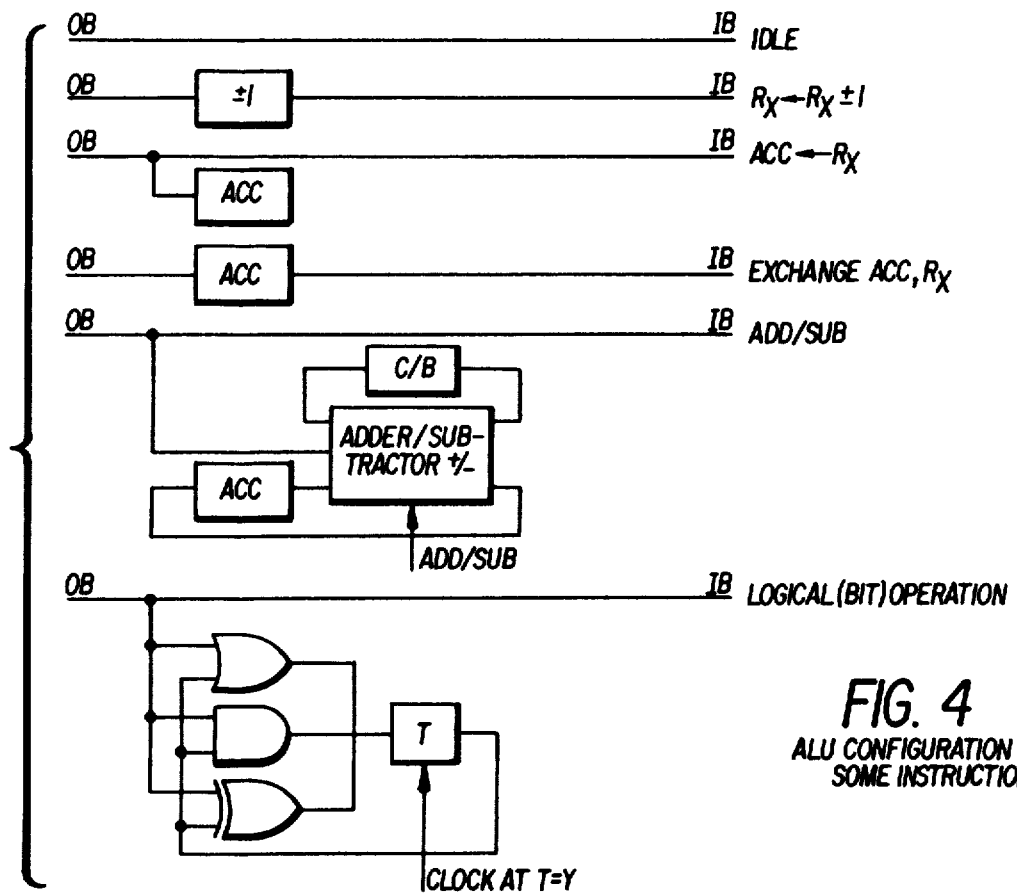
FIG. 4 shows diagrammatically typical ALU configurations for representative instructions.

The operation of the chip calculator/controller is serial with 4 time slots per instruction. With this arrangement a proper clocking allows bit manipulation. For example, if a reference is made to the most significant bit of $R_x$ ($R_{x3}$), the ALU will be in an idle state (NO OP) during the first 3 time slots and will be configured for the programmed function during the 4th time slot. FIG. 4 shows diagrammatically typical ALU configurations for representative instructions.

Figure 5:
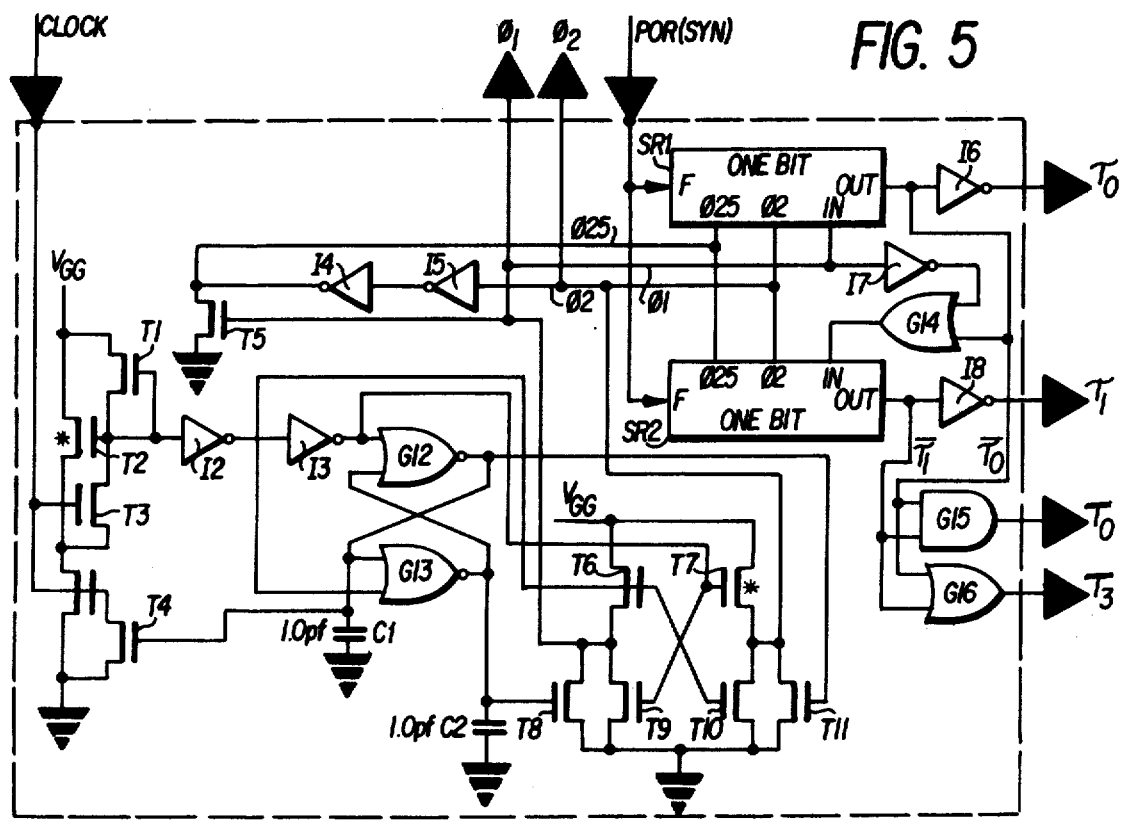
FIG. 5 shows in more detail the clock generator circuit of FIG. 2D.

Referring to FIG. 5, there is shown a representative circuit such as would be used in the CLOCK GENERATOR shown in FIG. 2D. As can be seen there are two inputs: one for an outboard clocking circuit, and another input for the synchronous Power on Reset (POR- SYN) signal. The outboard clocking circuit (not shown) is a type well-known in the art and may be for instance a continuously pulsed square-wave generator. The CLOCK GENERATOR has two outputs, labeled $\phi_1$ and $\phi_2$ for applying a two phase control signal to various elements on the calculator/controller chip. Output $\tau_0$ is triggered by a signal from shift register SR1. Output $\tau_1$ is triggered by a signal from shift register SR2. Output $T_0$ is triggered by a logic condition of $\bar{\tau}_0$ AND $\bar{\tau}_1$, while output $T_3$ is triggered by a logic condition of $\bar{\tau}_0$ OR $\bar{\tau}_1$. Associated with these above components are transistors T1-11, gates G12-16, inverters I2-8, and capacitors C1-2. The CLOCK GENERATOR circuit of FIG. 5 is shown by way of example only, it being understood that any of a number of well-known clock generating circuits capable of two-phase operation with four sequentially timed outputs could be used with the present invention.

Referring to FIG. 6, the CFR unit mentioned above in connection with the operation of the ALU is shown in more detail. The CFR unit is a programmed logic array or a 2K static UV erasable PROM, for example Intel Corp. part No. 1702A. Such devices are well-known in the art and are exemplified by U.S. Pat. No. 3,660,819. FIG. 6 shows how the CFR unit is hardwired programmed in order to generate the various configuration signals needed by the ALU and other elements of the calculator/controller system. The CFR unit has 9 inputs: seven from the Operation Code field of an instruction in the IR (see FIG. 1A) labeled A,B,C,D,E,F, and G; and two from terminals $\tau_1$ and $\tau_0$ of the CLOCK GENERATOR. The CFR has 14 outputs, as shown, for controlling the function of the ALU, the DEC, the plurality of storage elements, and the TEST system.

Figure 2C:
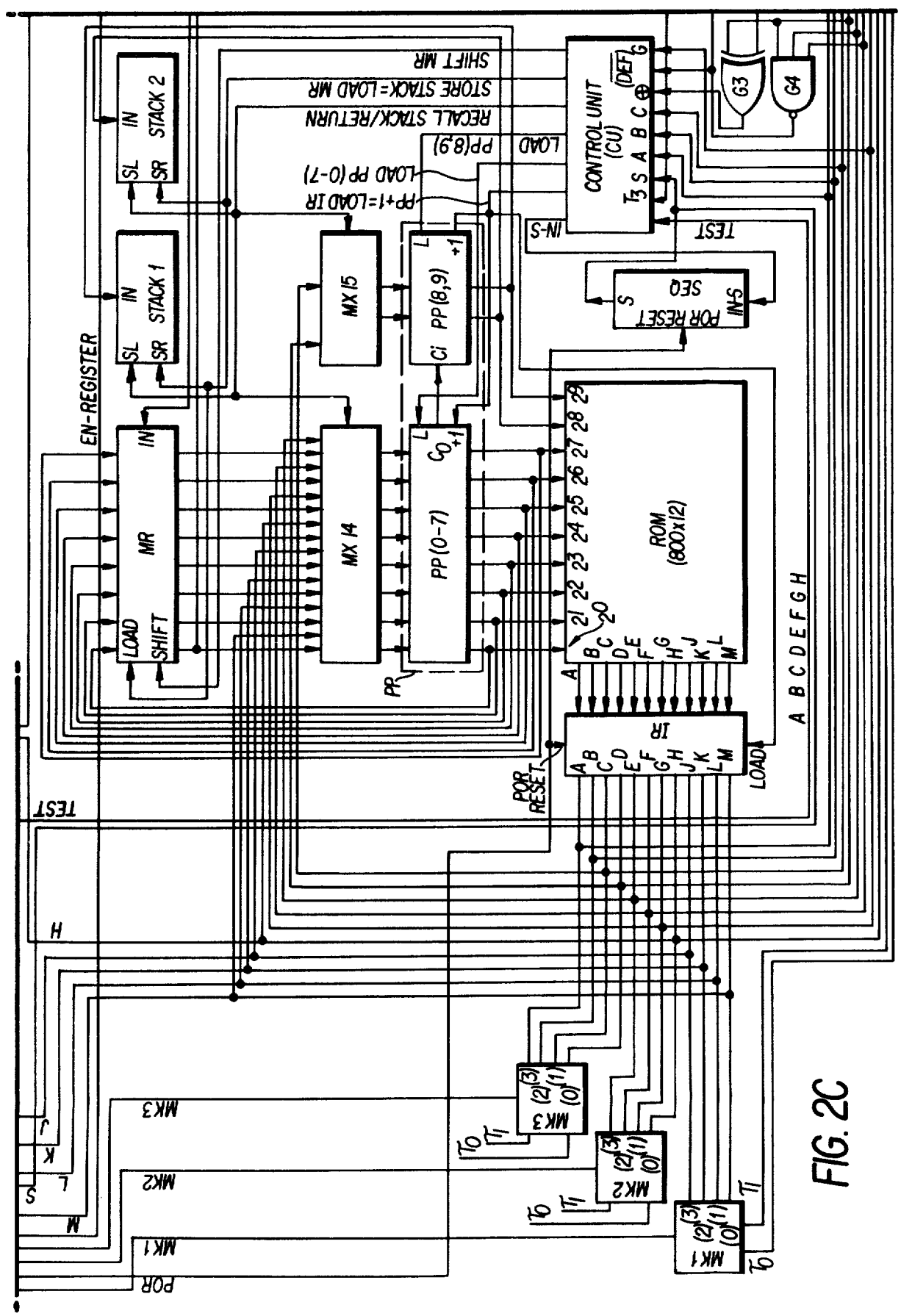
Figure 2D:
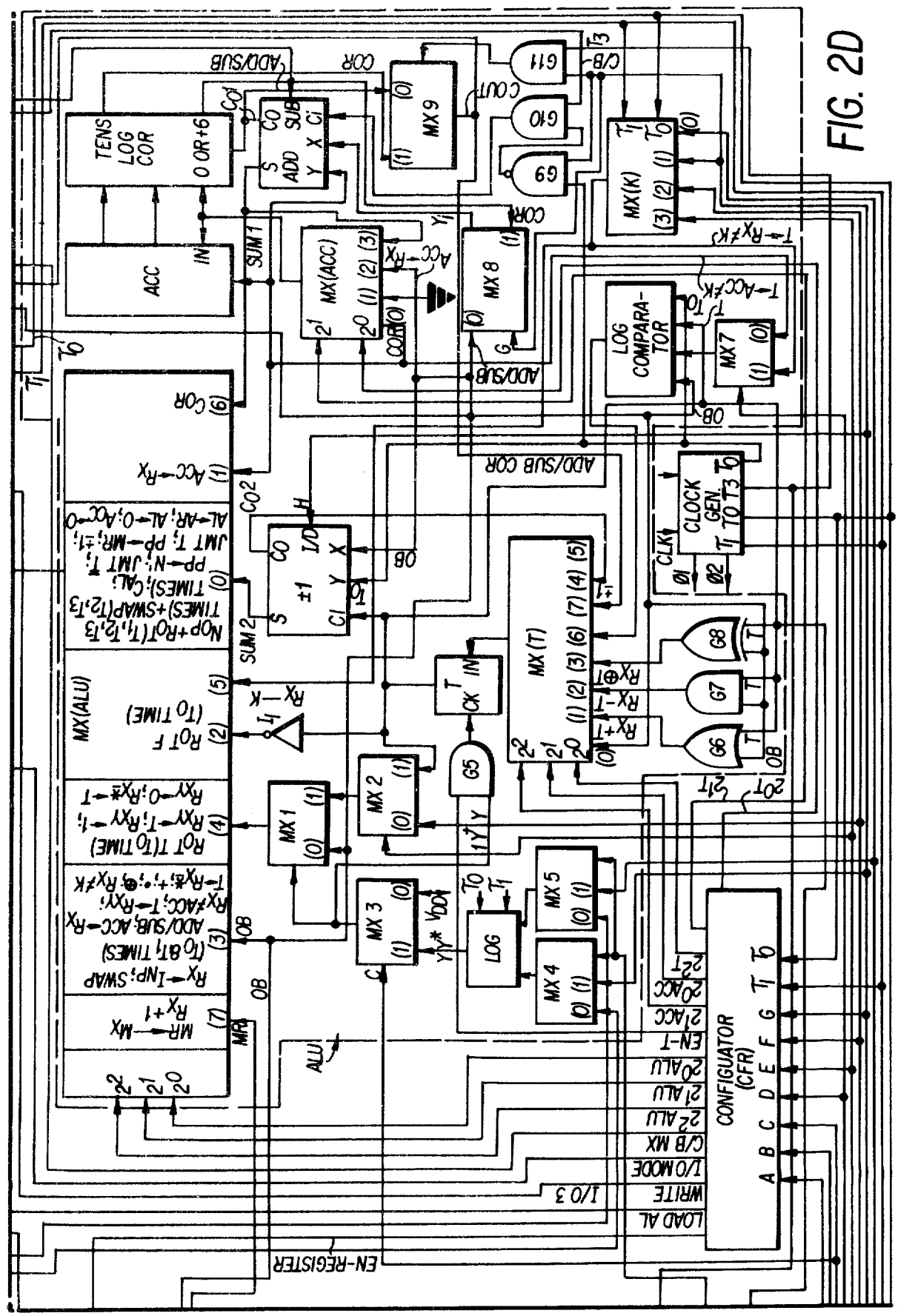

With reference to FIG. 2C, there is shown the ROM (Read Only Memory) addressing structure as used in the present invention. The ROM is a 12-bit by 800 word hardwired memory of a type well-known in the art. The ROM contains the operating instructions of the calculator/controller system. The ROM is addressed by a Program Pointer (PP) which can be incremented or loaded either from the Mark Register (MR) for a Return instruction, or from the Instruction Register (IR) for a Branch instruction.

The MR is an 8-bit wide parallel access shift register, comprising for example, two 4-bit shift registers such as TI 74195. Also associated with the MR are two hardwired stack registers STACK 1 and STACK 2 which may be for instance TI 74194 4-bit bidirectional universal shift registers. The MR may be loaded from the 8 outputs of the PP [comprised of PP(0-7) and PP(8,9)] in order to store the return link of a subroutine. It can also communicate, through a special instruction, with the active storage of the machine via the OB line connected to the terminal labeled IN of the MR and thus be modified by the data contents of the system.

The two stack registers STACK 1 and STACK 2 serve as auxiliary registers for the purpose of subroutine entry and exit in the operation of the system. See FIG. 7 for a listing of the repertoire of instructions which may act on that structure. Both the MR and STACK 1 and STACK 2 are controlled by signals from the Control Unit (CU). Contents of the PP are loaded into the MR or stored in STACK 1 or STACK 2 in response to a STORE STACK = LOAD MR signal from the CU. The 8-bit contents of the MR is loaded into PP (0-7) via the program pointer multiplexer MX14 in response to a SHIFT MR signal from the CU. MX14 is comprised of two 8-line-to-4-line multiplexers, such as the TI 74157, having a total of 16 input lines and 8 output lines. The contents of STACK 1 and STACK 2 are loaded into PP (8,9) via multiplexer MX15 in response to a RECALL STACK/RETURN signal from the CU. MX15 is comprised of a single 4-line-to-2-line multiplexer such as the TI 74157.

The eight line output of MX14 is applied directly to the inputs of PP(0-7). PP(0-7) is comprised of two synchronous 4-bit counters, such as the TI 74161. PP(0-7) will load the contents of the MR into its shift registers in response to a LOAD PP(0-7) signal from the CU. PP(0-7) will load the contents of the IR into its shift registers in response to a PP+1 = LOAD IR signal from the CU.

Similarly, the two line output of MX15 is applied directly to the inputs of PP(8,9). PP(8,9) is comprised of a single asynchronous 2-bit counter, such as the TI 74161. PP(8,9) will load the contents of STACK 1 and STACK 2 into its shift registers in response to a LOAD PP(8,9) signal from the CU. PP(8,9) will load the contents of the IR into its shift registers in response to a PP + 1 = LOAD IR signal from the CU.

The eight line output of PP(0-7) is connected directly to inputs $2^0$ - $2^7$ of the ROM and to the inputs of the MR. The two line output of PP(8,9) is connected directly to inputs $2^8$, $2^9$ of the ROM and to the inputs ("IN") of STACK 1 and STACK 2. When PP(0-7) is full a carry signal is sent to PP(8,9) from terminal $C_0$ of PP(0-7) to terminal $C_i$ of PP(8,9).

A 12-bit instruction in the ROM addressed by the PP will be fed out along lines A-M into the IR. The IR is a 12-bit wide shift register and may comprise a 1-word slice of the ROM or alternatively, may be three 4-bit parallel access shift registers such as the TI 74195. The IR has 12 output lines labeled A-M. Lines J, K, L, and M are connected to the inputs of the decoder DEC, seen in FIG. 2A. These four lines carry the four bits of the Register Select field of the Instruction Field (see FIG. 1A). Lines A-H of the IR are connected to the correspondingly labeled inputs of the CU, the CFR, and the ALU as shown in FIGS. 2C and 2D. Outputs A-M of the IR are also connected directly to the inputs of MX14 and to the inputs of the MK multiplexers MK1, MK2, and MK3. MK1-3 are identical 4-line-to-1-line multiplexers. MK1 has four inputs, labeled MK1(0-3) connected to output lines M,L,K,J respectively, of the IR. MK2 has four inputs, labeled MK2(0-3) connected to output lines H,G,F,E, respectively of the IR. MK3 has four inputs, labeled MK3(0-3) connected to output lines D,C,B,A, respectively of the IR. MK1, MK2, and MK3 are each controlled by signals from the CLOCK GENERATOR applied via lines $\tau_1$ and $\tau_0$. The outputs of MK1, MK2, and MK3 are applied to the inputs of the 3-bit multiplexer, MK, of the A latches (see FIG. 2A).

The IR receives a Power on Reset (POR) signal upon initial application of power to the calculator/controller system. The POR signal is applied to a synchronous circuit SYNC which is controlled by two inputs, $\phi_1$ and $\phi_2$, connected to the CLOCK GENERATOR. The SYNC circuit acts to synchronize the resetting of the various elements of the calculator/controller system with the output of the CLOCK GENERATOR. The SYNC circuit is of a type well-known in the art. The output of the SYNC circuit is connected directly to the POR-RESET terminal of the IR, the POR-RESET terminal of the Sequencer (SEQ), and to the POR(-SYNC) terminal of the CLOCK GENERATOR. The output of the SYNC circuit is also connected to the terminals labeled POR of the four A latches, AL 1-4.

The contents of the ROM addressed by the PP will be loaded into the IR upon the application of a PP + 1 = LOAD IR signal from the CU to the LOAD terminal of the IR.

The purpose of the IR is to store an instruction to be executed while a fetch (of the next instruction) is initiated. This arrangement allows the fetch time of an instruction to be masked by the execute time of the preceding instruction. This is an important aspect of the invention since it allows a relatively slow ROM to be used in the invention without a reduction in cycle time, while still retaining the simplicity of the above-described addressing system. This feature of the invention will be described in more detail below.

Figures 8A, 8B:
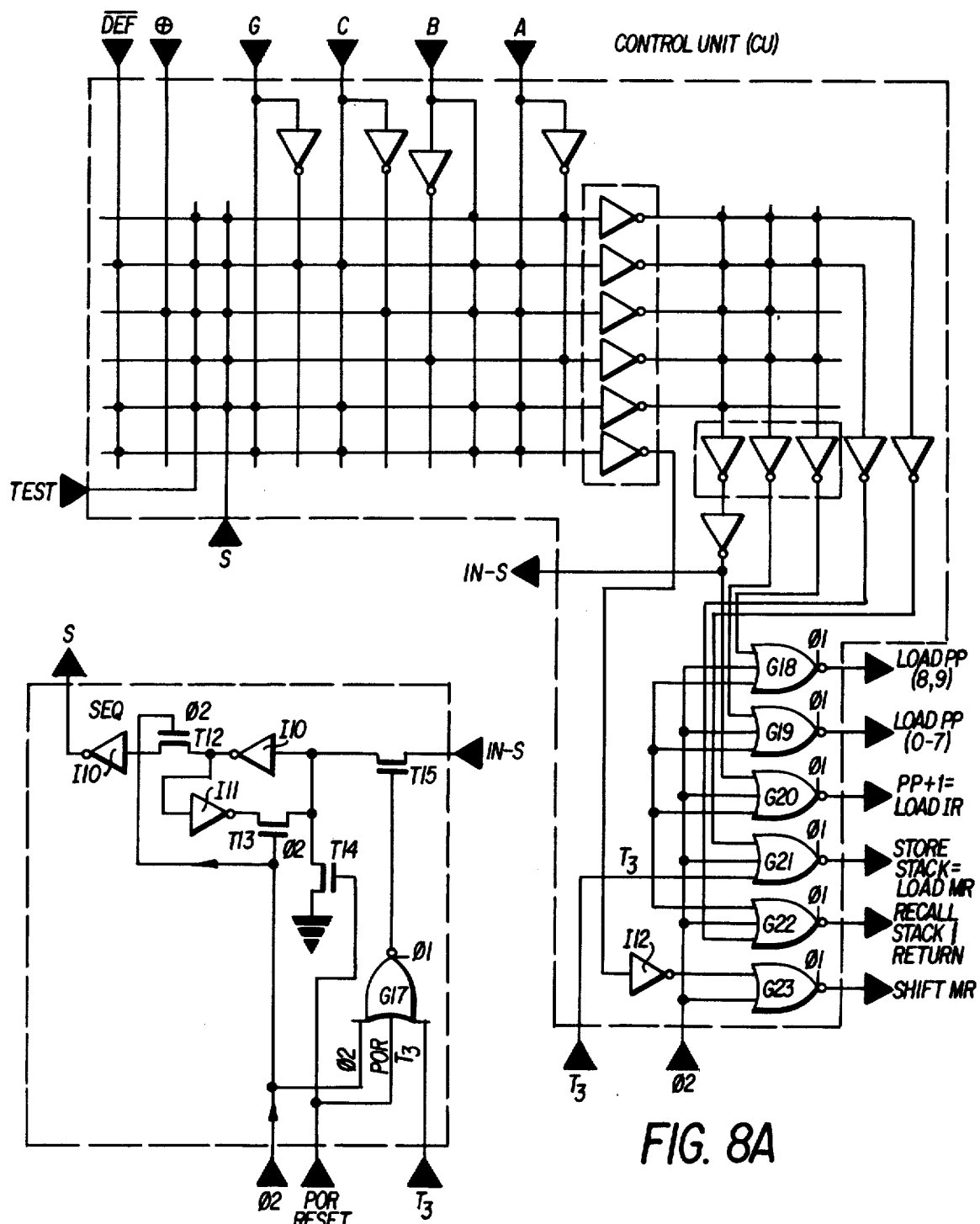
FIG. 8A shows in more detail the Control Unit of FIG. 2C.
FIG. 8B shows in more detail the Sequencer circuit of FIG. 2C.

Referring to FIG. 8A, the above-mentioned Control Unit (CU) is shown in more detail. The CU is a programmed logic array or a portion of a 2K PROM, such as the Intel Corporation's UV erasable EPROM no. 1702A. The CU is hardwired programmed to perform its various control functions. The CU may selectively control the SEQ, the PP, the IR, STACK 1 and STACK 2, and the MR in response to the inputs labeled TEST, $T_3$, S, A, B, C, $\oplus$, $\overline{DEF}$, and G. Also associated with the outputs of the CU are six NOR gates G18-23, for selectively outputting the CU control signals LOAD PP(8,9), LOAD PP(0-7), PP+1 = LOAD IR, STORE STACK = LOAD MR, RECALL STACK/RETURN, and SHIFT MR, respectively. An output is also provided, labeled IN-S, for controlling the operation of the Sequencer circuit SEQ, shown in FIG. 8B.

The SEQ acts to properly sequence the operation of the CU after power is applied to the calculator/controller system. The SEQ circuit is comprised of gate G17, inverters I9, I10, I11 and transistors T12, T13, T14, and T15. The SEQ has four inputs: one from the SYNC circuit (see FIG. 2A) via line POR(SYN) and connected to the terminal labeled POR-RESET of the SEQ; one input labeled IN-S which is connected to the correspondingly labeled output of the CU; and inputs $\phi 2$ and $T_3$ both connected to the correspondingly labeled output terminals of the CLOCK GENERATOR (see FIG. 2D).

The SEQ has one output, labeled S, which is connected to the correspondingly labeled input of the CU and to one input of NOR gate G1, shown in FIG. 2A. The other input of gate G1 is connected to line M of the output of the IR (see FIG. 2C). The output of G1 is applied to one to the four inputs of the DEC and is also used to control the operation of the WS multiplexers MX10 and MX11 shown in FIG. 2A.

Calculator/Controller Testing

A second and important feature of the present invention is that the above-discussed calculator/controller logic organization and architecture allows all internal storage elements to be directly read out or written for testing purposes.

Testing of LSI calculator chips poses formidible problems: the complexity of the circuitry and interconnections makes diagnostic testing a time consuming affair since literally thousands or millions of possible operating states exist in today's high density LSI chips. Ease and quality of testing is directly related to the capability to read out and write the status of the various internal storage elements of an LSI calculator/controller chip. One such common prior art method uses a test pin to route the state of the internal storage elements to output pins by means of a multiplexer controlled by the test pin, and route to state of input pins to the active storage element by the same means. This technique, however, cannot be used when the number of active storage elements is high, as is the case in a single chip calculator/controller.

With reference to FIGS. 1 and 1A of the drawings, the present invention overcomes these problems by providing a structure for a single chip calculator/controller comprising an arithmetic-logic unit (ALU) and a plurality of active storage elements (1,2,i, ... n) where the ALU and the storage elements are interconnected in parallel via an input bus (IB) and an output bus (OB). The CFR unit decodes the Operation Code field of an instruction present in the IR for selectively configuring the logic elements which comprise the ALU. The DEC decodes the Register Select (element enable) field of an instruction present in the IR for selectively energizing the active storage elements.

In the present invention two test pins, TP1 and TP2, are provided. TP1 is placed in the IB and TP2 is placed in the OB. TP1 and TP2 are placed in the TEST mode by the application of a TEST signal to their terminals. All the storage elements may then be directly read out or written via these two test points by simply decoding an instruction from the IR so as to cause the CFR to configure the ALU and the DEC to access a particular storage unit. This technique eliminates the need for a separate multiplexing unit and simplifies the task of testing since the ALU may act upon any of the storage elements via the parallel input/output bus lines.

Further, in the present invention, means are used which require only two nodes to be routed by the test pin to and from the output or input pins. In doing so, all internal storage elements can be directly read out or written, in which case the problem is reduced to the single problem of testing a combinatorial network.

In the TEST mode, the IB is opened by a TEST signal applied to TP1 such that the combinatorial network (the ALU) output is routed to outside diagnostic or testing apparatus (not shown). The purpose of the diagnostic or testing equipment, which may be for example a Fairchild Corporation "Sentry 600" LSI chip tester, is to simulate the execution of the microprogram contained in the ROM. The active storage elements receive data input from a return link from the diagnostic or testing apparatus via TP1. It will be noted that in the normal mode the ALU output along the IB is tied directly to the inputs of the active storage elements.

Similarly, the OB is opened by a TEST signal applied to TP2 such that the output of the active storage elements is routed to outside diagnostic or testing apparatus (not shown). Data flow from the diagnostic or testing apparatus is returned to the OB through TP2. In the normal mode the output of the active storage elements along the OB is tied directly to the input of the ALU.

This testing technique is made possible by the double bus structure and the above-described addressing system which gives, in the same instruction, both the operation to be performed in the ALU (Operation Code field) and the selected storage element address (Register Select field). The above testing technique can be used either for a serial or a parallel data organization. In the latter case the quantity of nodes routed will be two times the number of parallel bits in a bus.

System Operation

A third and important feature of the present invention is that the above-discussed calculator/controller logic organization and architecture allows the fetch time of an instruction to be masked by the execute time of the preceding instruction.

Conventional accessing techniques for high density ROMs usually yield very long access times; for example: an organization having a serial fetch and execute cycle is simple to fabricate but requires a great deal of machine cycle time; an organization having a parallel fetch and execute cycle is quicker in terms of machine cycle time but requires a more complex control unit.

In the present invention, the fetch time of an instruction is masked by the execute time of the preceding instruction. This result is accomplished by providing a ROM addressable by a Program Pointer (PP) which can be incremented or loaded either from the Mark Register (MR) for a Return instruction, or from the Instruction Register (IR) for a Branch instruction (see FIGS. 1 and 2A, 2C). The IR stores an instruction (in binary code) to be executed while a fetch (for the next instruction) is initiated by the PP. The PP is capable of incrementing by one its contents or loading in parallel a binary code present on its outputs. The MR can be loaded from the PP to store the return link of a subroutine. The ROM, IR, PP, and MR are all under the control of the hardwired PROM Control Unit (CU) shown in FIG. 2C.

With reference to the System Timing diagram, FIG. 9, it can be seen that each instruction is executed in 4-bit time ($T_0$, $T_1$, $T_2$, $T_3$).

Assume an instruction is available in the Instruction Register (IR) at the beginning of $T_0$. The Operation Code field of the instruction will be decoded and the ALU data routers will be set up in the proper configuration, while the least significant bit of the selected register (DIGIT) is driven on the output bus OB. Information will propagate and eventually will stabilize. At the end of $T_0$, a clock pulse will sample that information by shifting the state of the input bus into $R_x$, and acting in the same manner on ACC, T and C/B if they are referenced by the instruction. The time counter will change to $T_1$, the second bit of $R_x$ will be driven on the output bus, and the same process will continue until the $T_3$ clock pulse. During that execute cycle, the state of the Program Pointer propagates through the ROM. The $T_3$ clock pulse will load the IR from the outputs of the ROM, making a new instruction available for the next cycle. The PP will also be incremented by the $T_3$ clock pulse, initiating the fetch of the next (+1) instruction.

If a Branch instruction has to be performed, the same cycle is entered but no clocking occurs. The $T_3$ clock pulse will load the PP with the branch address, while the fetch which has been done during that cycle is discarded by not loading the IR. The next cycle will be a NO-OP cycle while will only fetch and load the next instruction.

An instruction which references a bit is executed in the same manner as described above, except that the ALU is left in an idle state except for the time slot which is associated with the referenced bit.

Shift instructions use the same basic cycle, but clocking occurs only during one or two bit time, depending on the instruction.

$R_x$, $R_x+1$, MR $\leftarrow$ MR, $R_x$, $R_x+1$ uses two times the basic cycle, the second cycle complementing the least significant bit of the Register Select field.

Although the above invention has been described in conjunction with discrete electrical components so that the operation of the calculator/controller system may be more readily comprehended, it is understood that other methods and techniques for fabricating the invention will be obvious to one skilled in the art. For example, the above-described calculator/controller organization could be implemented by the use of conventional LSI (large scale integration) MOS (metal oxide semiconductor) technology. The choice of semiconductor fabrication techniques such as P or N-channel MOS, $I^2L$, bipolar, or other types, will dictate design considerations and modifications in circuit layout to those skilled in the art.

PROGRAMMING CONSIDERATIONS

GENERAL

The ability to store return links into the memory leads to a program built by means of successive levels of subroutine. In other words a first level of subroutine is created which in turn is used in the definition of the next level of subroutine, etc. to the point where a virtual machine is created with an instruction set well suited to program a specific application. The ability to define parameters is particularly helpful. For example, in the case of a three word calculator, functions like ACCUM $\leftarrow$ ACCUM + ENTRY, MEMORY $\leftarrow$ MEMORY + ACCUM, or MEMORY $\leftarrow$ MEMORY + ENTRY will be needed. This ability is achieved by creating an instruction like $i \leftarrow i+j$, where i and j are passed parameters which will be read in a predetermined location of the Store by the subroutine. The calling procedure in the main body of the program will simply consist of:

1. A specification of the proper values for i and j, written in the predetermined location of the Store; and
2. A call on the subroutine.

However, attention should be paid to the fact that the different levels of subroutine will have to share common resources and that conflicts in allocation may occur.

Sequencing

The conditional and unconditional branching instructions of the present invention allow an easy implementation of the conditional statement, the "while" loops, and the "for" loops. The "Case of i" statement can also be implemented by classical means, but it is also possible to use the ability to modify the contents of the Mark Register by the data contents of the machine. Following a proper setting of the Mark Register (MR), the (PP $\leftarrow$ MR) instruction is used, causing the program to enter the branching map of the Case statement, for example:

| n−2 | MR | $\leftarrow$ | (n+i) | |
|-----|----|----|------|---|
| n−1 | PP | $\leftarrow$ | MR | |
| n   | PP | $\leftarrow$ | LOCATION OF CASE | i=0 |
| n+1 |    |    | "    | i=1 |
| "   |    |    | "    | i=2 |
| "   |    |    | "    | i=3 |
|     |    |    | etcetera | |

SENSING

The ability to store the contents of T (the one-bit Boolean accumulator) and to combine T logically with any bit of the memory allows for easy handling of complex Boolean equations. Intermediate results can be evaluated and stored or a stacked operation can be devised at will.

It will be noted that the carry or borrow sense operation is hardwired for the appropriate instructions. Data organization will take advantage of that feature.

Interfacing Techniques

Interfacing with input/output devices can be thought of as controlling the time evolution of a bit pattern in relation to sensed external conditions. The I/O registers of the machine control 35 external signals, 11 of which can be sense-line signals. Assuming the rate of change of the bit pattern is one or two orders of magnitude slower than the machine cycle, almost any kind of bit pattern evolution can be controlled, the instruction repertoire allowing many ways of setting a given pattern into the I/O registers. Interfacing with an input/output device is simply a matter of drawing a timing-chart and implementing it by program.

APPLICATION IN A 12 DIGIT PRINTING MACHINE

This section describes techniques which can be used to give the single chip calculator system of the present invention performance equivalent to those of more sophisticated and complex systems.

An implementation of the arithmetic functions is also described which achieves a systematization of the data manipulation involved in a calculator. In particular, the "error" condition detection is simplified.

I - A single Processor For Multiple Processes

In general, a calculator can be described as a set of processes which can evolve simultaneously: for example, the input process (keyboard matrix scanning and key depression detection), the output process (control of the output device) and the machine (or main) process (see FIGS. 10A and 10B).

Referring to FIGS. 11A and 11B, there are shown two prior art solutions: either a single processor is used to deal sequentially with the different processes as in a display machine, or different pieces of hardware are dedicated to the input, output, and main processes as in a printing machine.

In the case of a printing machine, a single processor is available, but dealing sequentially with the different processes yields poor performances (since there is no buffered keyboard) and more sophisticated time sharing techniques have to be used.

1. Input process - Main process

Key depressions are a periodic phenomenon; thus the state of the keyboard matrix (KB) can be sampled periodically, assuming the sampling frequency is high enough. It is then simple to create a subroutine which scans the matrix, validates key depressions and writes in a FIFO buffer. Other processes are then implemented with the processor and interrupt themselves every x msec. to call the keyboard subroutine. See FIG. 12 for an example of one such subroutine.

This interrupt procedure is a real-time constraint but is readily dealt with in the present invention. Assuming that the maximal sampling period is in the 10–20 msec. range, then only the idle state, the multiplication and division routines and the output process need be interrupted.

As these processes, in general, contain two imbedded loops, an interrupt will occur upon exit of the inner loop. See FIG. 13 for an example of a multiplication routine used in the present invention which uses two imbedded loops and an interrupt procedure.

Keyboard Routine

Many techniques can be used for the keyboard routine in the present invention. The technique shown diagrammatically in FIG. 14, for example, offers key rollover, and a minimal number of bits are needed to save the keyboard process state.

Figure 14:
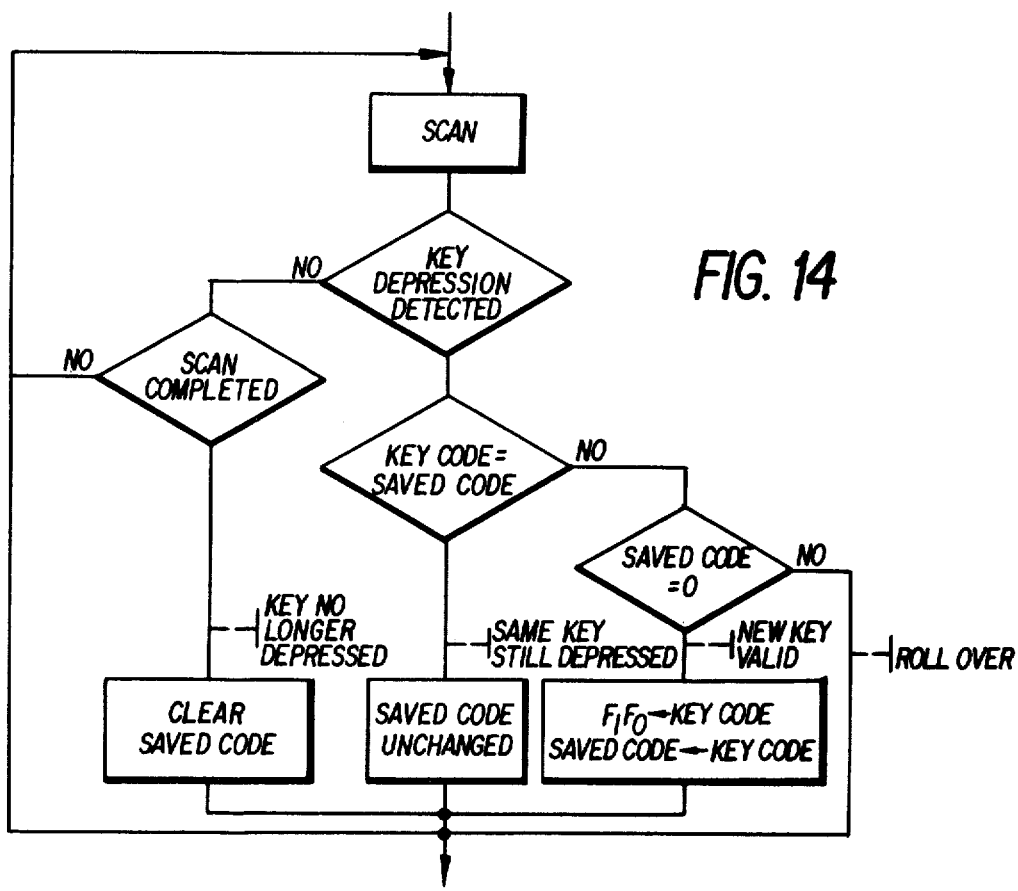
FIG. 14 illustrates a keyboard routine having periodic sampling as used in the present invention.

It will be noted that the debouncing time of the keyboard matrix when using the routine shown in FIG. 14 is implied by the sampling frequency (bounces occur at too high frequency to be seen by a periodic sampling of the matrix).

2. Output process — Main process

With earlier prior art techniques, little is done by the hardwired output processor. It is a counter which runs synchronously with the drum of a continuously running printer, or it is a logic element which detects and proceeds at the "end of cycle" condition of a start-stop printing mechanism. This technique allows the CPU (Central Processing Unit) to use minimal time for the output process.

Figure 15A:
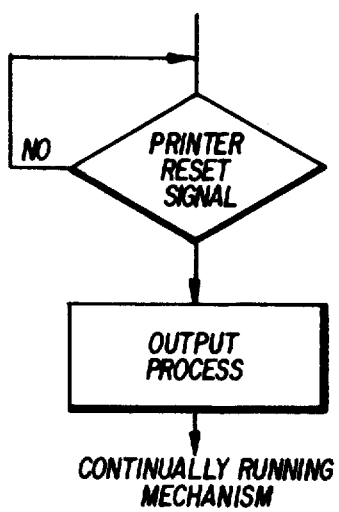
FIGS. 15A and 15B are generalized functional diagrams illustrating prior art methods for processing calculator data output with printers having a continuously running mechanism and a start-stop mechanism, respectively.
Figure 15B:
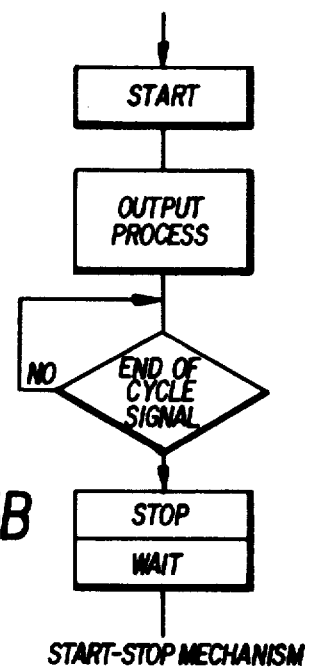

Referring to FIGS. 15A and 15B, one prior art solution for the single processor case is where the main and output processes are dealt with sequentially. Prior to the execution of the output process, the machine will wait for a synchronization signal from the printer in the case of a continuously running printer (see FIG. 15A) or for the end of cycle condition which is controlled by the processor following the positioning of the wheels in the case of a start-stop mechanism (see FIG. 15B).

Start-stop mechanisms are more frequently used in modern printers because of operating efficiencies. However, prior art techniques for controlling start-stop printer mechanisms have used the CPU free-time to sense the end of cycle signal, as shown in FIG. 15B, which results in poor performance and inefficient use of both the processor and the printer.

One solution to the above problems encountered with prior art techniques is to use an interrupt or "end of cycle" signal to cause the end of cycle routine to be executed, such as shown in the timing chart of FIG. 16. However, the logic of the above-described single chip calculator/controller system does not contain an interrupt feature.

The present invention overcomes this problem by implementing an interrupt by means of programming. Assuming that the duration of the "end of cycle" signal is made long enough to be sampled at the same rate as the keyboard matrix, then the keyboard routine can be written to sense the end of cycle signal and call the "end of cycle" routine. As the keyboard routine will have to be reentered from the end of cycle routine (the end of cycle routine is expected to last more than one keyboard matrix sampling period) and as there is a limit to the size of the program pointer stack, a special technique has to be used to merge these two routines into a single "real-time" routine. Such a technique is shown more clearly in FIG. 17.

Figure 17:
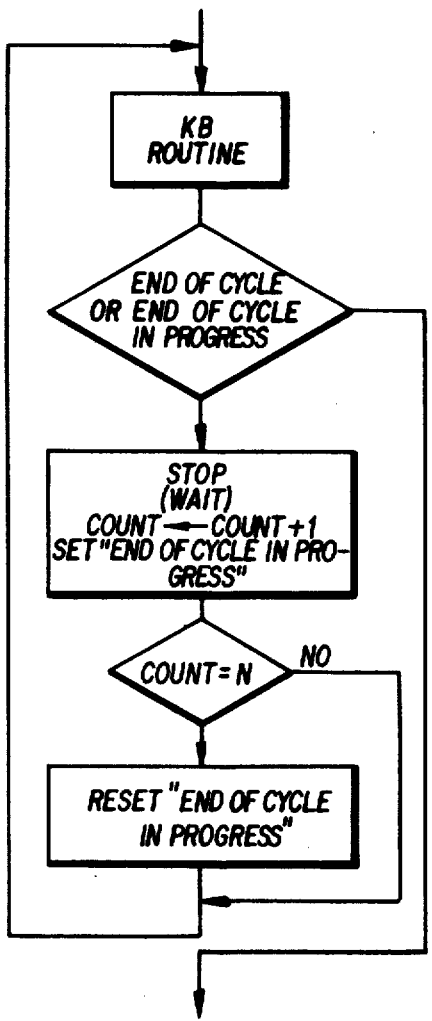
FIG. 17 illustrates a programming routine for controlling a start-stop type printer as used with the present invention.

In the technique exemplified by FIG. 17, a flag is used to enable the routine to perform the two functions described above. The processor can thus be assigned to any job after the printer wheels have been positioned. FIG. 18 illustrates the timing of the various processes encountered in the "real-time" routine. If the duration of the end of cycle signal is such that a real-time routine like the one above cannot be defined, then no general solution exists. Methods can be used to assign the processor to a job that will be completed before the time the end of cycle signal is expected, or to a job that will interrupt itself at that time. Then the end of cycle routine will be entered which will continuously sense the end of cycle signal. One such method is illustrated by the timing chart shown in FIG. 19.

II - Data Word Organization — Arithmetic

In the above described calculator/controller system numbers are normalized and are represented by a 12 BCD (binary coded decimal) digit signed mantissa and an 8-bit binary exponent (two's complement). Internal range of the calculator is thus from $1.0 \times 10^{-127}$ to $9.\overline{9} \times 10^{+127}$. This range is such that a machine overflow condition need not be detected by the arithmetic logic.

For arithmetic operations, the accumulator word is extended by an overflow digit. This allows an additional/subtraction step or a repeated addition/subtraction loop without prescaling of the operands. The renormalization which follows an arithmetic operation will have to detect an overflow digit and take appropriate action. It should be noted that the overflow digit will be only temporarily assigned to a given word.

During I/O operations, numbers are not usually normalized. The numbers are justified on an exponent, meaning that the number is adjusted so that its exponent has a known value whereas its MSD (most significant digit) may be zero.

Figure 20:
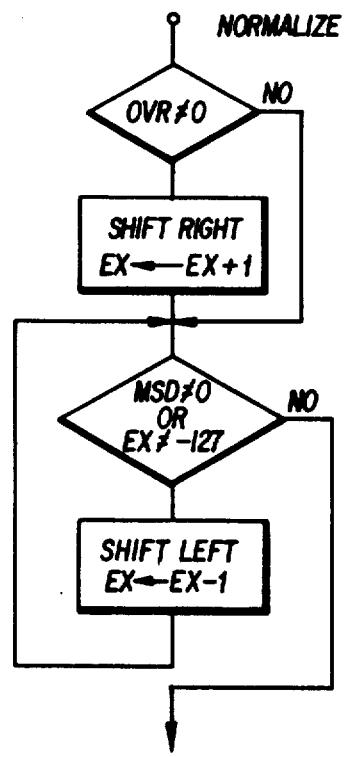
FIG. 20 shows a "Normalize" routine as used in the present invention.
Figure 21:
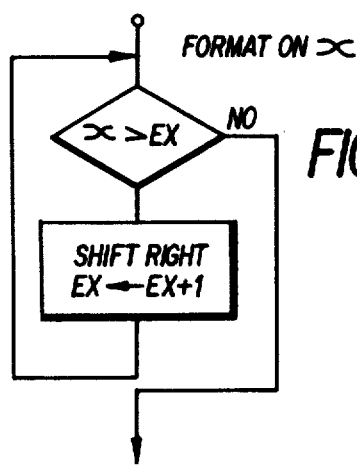
FIG. 21 shows a "Format on X" routine as used in the present invention.

The above-described arithmetic organization is illustrated by the following two subroutines:

(1) With reference to FIG. 20, the "Normalize" routine will adjust numbers so as to make their exponents minimal. Any input data format is acceptable to this routine, and in particular data words to which an overflow digit has been temporarily assigned;

(2) With reference to FIG. 21, the "Format on x" routine will represent a number so that its exponent will be equal to x. The input data format for this routine will be normalized. Note that if Ex>x, the routine will not be executed for there is no way to write a normalized number with an exponent smaller than the one present. This routine is used each time a fixed decimal point representation is needed (e.g. output formating, decimal point alignment prior to addition/substraction). It will be noted that the "normalize" routine works for the value zero because a normalized value is such that the exponent is minimal. However, a faster algorithm may be preferred which separately processes a mantissa equal to zero. In addition, in the present invention an overflow is temporarily assigned, and then cleared when not in use.

Figure 22A:
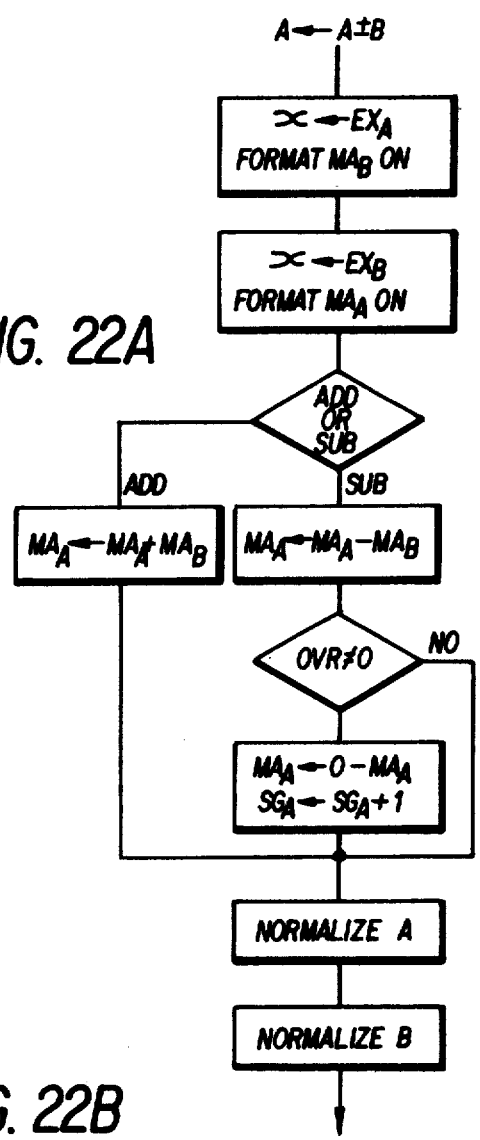
FIGS. 22A and 22B show algorithms for addition/subtraction and multiplication/division, respectively, as used in the present invention.
Figure 22B:
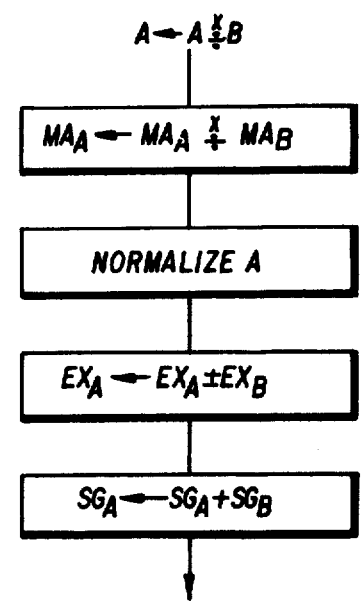

Multiplication and division processes by repeated addition-substration are well-known. In the present invention a straight-forward division algorithm may give only 11 significant digits. FIGS. 22A and 22B respectively show typical addition/subtraction and multiplication/division arithmetic operations as could be used in the present invention. In FIGS. 22A and 22B, $SG_i$, $MA_i$, $EX_i$, stand for the sign, the mantissa and the exponent of word i, respectively.

Output Formatting

Output formatting will use the "format on x" routine described above, x varying according to the chosen format and the user's decimal setting. The user's "decimal setting" parameter can be expressed as an exponent, ($EX_D$) so that the subroutines used to compute will exponents can be used to calculate the value of x for the output formatting. For example, the following rule:

"All integer digits and as many decimal digits as possible, excluding trailing zeros, but with as many decimal digits as the user's decimal setting if possible", is implemented by the following process:

$x \leftarrow EX$ + Number of trailing zeros
IF $x < 0$ then $x \leftarrow 0$
If $x > EX_D$ then $x \leftarrow EX_D$
format on x where EX is the exponent of the number to be printed. The number will then be correctly formatted, except if more integer digits than printable exist ($EX \geq 12$). This condition (machine overflow condition) is detected by a routine which is entered prior to the print routine. An error condition may result. It is the only point in the program where such a condition is looked for.

Round Off Operation

The Round Off Operation uses the fact that the addition-substraction routine as defined above works even if the two input numbers cannot be aligned within the 12 digits of the mantissas. Following the addition-substraction routine, an instruction to "format an $EX_D$" will clear all decimal digits with a lesser weight than the weight of the digit which has been rounded off. The Round Off operation is parametrized on the user's decimal setting.

The following example illustrates how the Round Off operation acts to round off a number "A":
(1) $A \leftarrow A + [(SG_A) \times 5 \times 10 - (EX_D - 12)]$
(2) $x \leftarrow EX_D$
(3) Format A on X
(4) Normalize A

III-Multi-Chip Configuration

Figure 23:
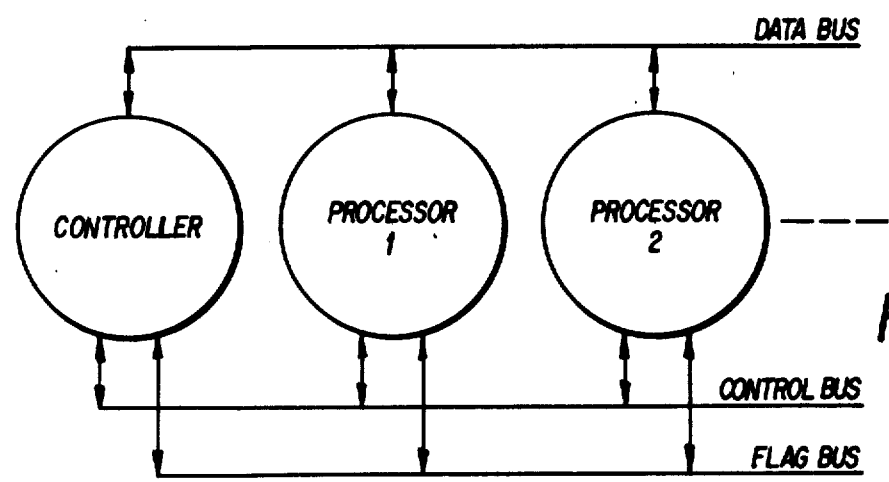
FIG. 23 illustrates an alternative embodiment of the invention comprising a multi-chip system having parallel processor and controller elements.

The flexibility of the logic organization and architecture of the above described single chip calculator/controller system makes it possible to use a plurality of such calculator/controller chips to create very large and powerful systems. In such a multi-chip system chips would be programmed for specific tasks and would be connected on a single bidirectional bus as shown in FIG. 23. A controller (a chip which is programmed for that function) would supervise the array. Data would be transferred from chip to chip using an asynchronous (handshaking) communication technique. Such an asynchronous communication scheme has to be used for chips having an internal clock generator, such as in the present invention.

The hand shaking technique shown in FIG. 24 is well known. Two control signals are necessary:

"EMT" is controlled by the talker and sensed by the listener; and

Figure 25:
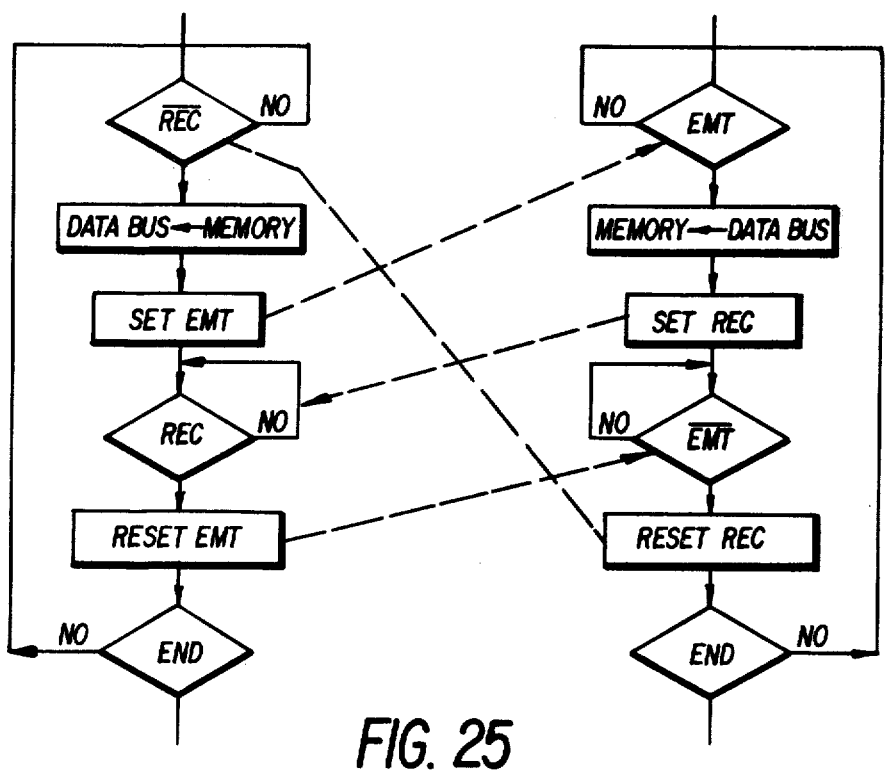
FIG. 25 illustrates the algorithms used to synchronize data transfer between the elements of the multi-chip system shown in FIG. 23.

"REC" is sensed by the talker and controller by the listener. FIG. 25 illustrates the algorithms which may be used to implement the above-mentioned handshaking technique in the present invention so as to synchronize two chip calculator/controllers.

No limits exist to the numbers of chips which can be connected together as described above except for the following constraints:

(a) The ratio of program storage to active storage remains constant as the number of chips increases, while in general the demand for active storage increases with the size of the system; and (b) an array of processors is well suited for concurrent processes. The degree of concurrency (except possibly for a preprogrammed machine) is not normally very high in a calculator environment.

While the single chip calculator/controller system of the present invention has been described in considerable detail, it is understood that various changes and modifications may occur to persons of ordinary skill in the art without departing from the spirit and scope of the invention as is defined in the appended claims.

What is claimed is:

1. A testing structure for a microprocessor comprising:
   combinational network means, said combinational network means comprising a plurality of logic elements wherein said logic elements are capable of being selectively configured in a plurality of combinations;
   a plurality of data storage elements for containing data, said data storage elements being connected in parallel with said combinational network means by means of an input bus and an output bus;
   program storage means, said program storage means containing a plurality of instructions;
   control means for controlling instruction execution;
   means for selecting one of said plurality of instructions in response to signals from said control means;
   means for storing said selected instruction;
   a first means for decoding a portion of said selected instruction to generate a configuration signal for selectively configuring said logic elements of said combinational network means;
   a second means for decoding the remainder of said selected instruction to generate a storage element select signal for selectively actuating selected storage elements, said data contents of said selected data storage elements being modified by said selectively configured logic elements of said combinational network means;
   diagnostic testing means connected to said input bus and said output bus;
   means for selectively routing data flowing along said input bus and said output bus to and from said diagnostic testing means, for selectively testing the operation of said combinational network means and said plurality of data storage elements, respectively; and
   data clocking means connected to said combinational network means, said control means, and said first decoding means, for controllably sequencing the operation of said combinational network means, said control means, and said first decoding means.

2. The invention of claim 1 wherein said selective data routing means comprises:
   a first test port means placed in said input bus line;
   a second test port means placed in said output bus line; and
   means for actuating said first and second test port means to place them in a test mode.

3. The invention of claim 2 wherein said first and second test ports means each comprise data multiplexers.

4. The invention of claim 2 wherein said means for actuating said first and second test port means comprises a test actuation signal applied to control terminals of said first and second test port means.

* * * * *